United States Patent
Cadieux et al.

(10) Patent No.: US 12,504,975 B2
(45) Date of Patent: Dec. 23, 2025

(54) EFFICIENT UTILIZATION OF SYNCHRONIZATION PRIMITIVES IN A MULTIPROCESSOR COMPUTING SYSTEM

(71) Applicant: Microsoft Technology Licensing, LLC, Redmond, WA (US)

(72) Inventors: Kevin Cadieux, Port Orchard, WA (US); Ian M. Bearman, Seattle, WA (US); Kirsten J. Lee, Redmond, WA (US); Mohana Tandyala, Fremont, CA (US); Gabriel Campbell, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 18/525,316

(22) Filed: Nov. 30, 2023

(65) Prior Publication Data

US 2025/0181354 A1    Jun. 5, 2025

(51) Int. Cl.
*G06F 9/38* (2018.01)
*G06F 8/41* (2018.01)
*G06F 9/45* (2006.01)
*G06F 9/50* (2006.01)

(52) U.S. Cl.
CPC .......... *G06F 9/3838* (2013.01); *G06F 9/5044* (2013.01)

(58) Field of Classification Search
CPC ...... G06F 9/3838; G06F 9/5044; G06F 8/433; G06F 8/443; G06F 8/458; G06F 9/52; G06F 9/528; G06F 12/0862; G06F 9/3005; G06F 9/3017; G06F 9/542
See application file for complete search history.

(56) References Cited

U.S. PATENT DOCUMENTS

| | | | | |
|---|---|---|---|---|
| 11,182,715 B2* | 11/2021 | Voorhies | ............. | G06F 16/9024 |
| 12,373,441 B1* | 7/2025 | Bhat | ................... | G06F 16/2237 |

OTHER PUBLICATIONS

Dutta, et al., "Synchronization Validation for Cross-Thread Dependences in Parallel Programs", International Journal of Parallel Programming, vol. 45, Oct. 28, 2016, pp. 1326-1365.
International Search Report and Written Opinion received for PCT Application No. PCT/US2024/051693, Jan. 30, 2025, 12 pages.
Li, et al., "Fine-Grained Synchronizations and Dataflow Programming on GPUs", Proceedings of the 29th ACM on International Conference on Supercomputing, Jun. 8, 2015, pp. 109-118.
Nicolau, et al., "Techniques for efficient placement of synchronization primitives", Proceedings of the 14th ACM SIGPLAN symposium on Principles and practice of parallel programming, Feb. 14, 2009, pp. 199-208.

* cited by examiner

*Primary Examiner* — Thuy Dao
(74) *Attorney, Agent, or Firm* — Scott Y. Shigeta; Newport IP, LLC

(57) ABSTRACT

A compiler creates a dependency graph for a function in an input program. The dependency graph includes nodes corresponding to commands in the function and edges that correspond to dependencies between the commands. The compiler performs a forward reachability analysis on the dependency graph to eliminate redundant dependencies. The compiler also adds a minimized set of back-edges to the dependency graph to enforce loop-carried resource dependencies in the input program. The compiler then allocates synchronization primitives provided by a multiprocessor computing system, such as semaphores, to the commands in the function of the input program based on the contents of the dependency graph.

20 Claims, 20 Drawing Sheets

MINIMUM FLOW TEST

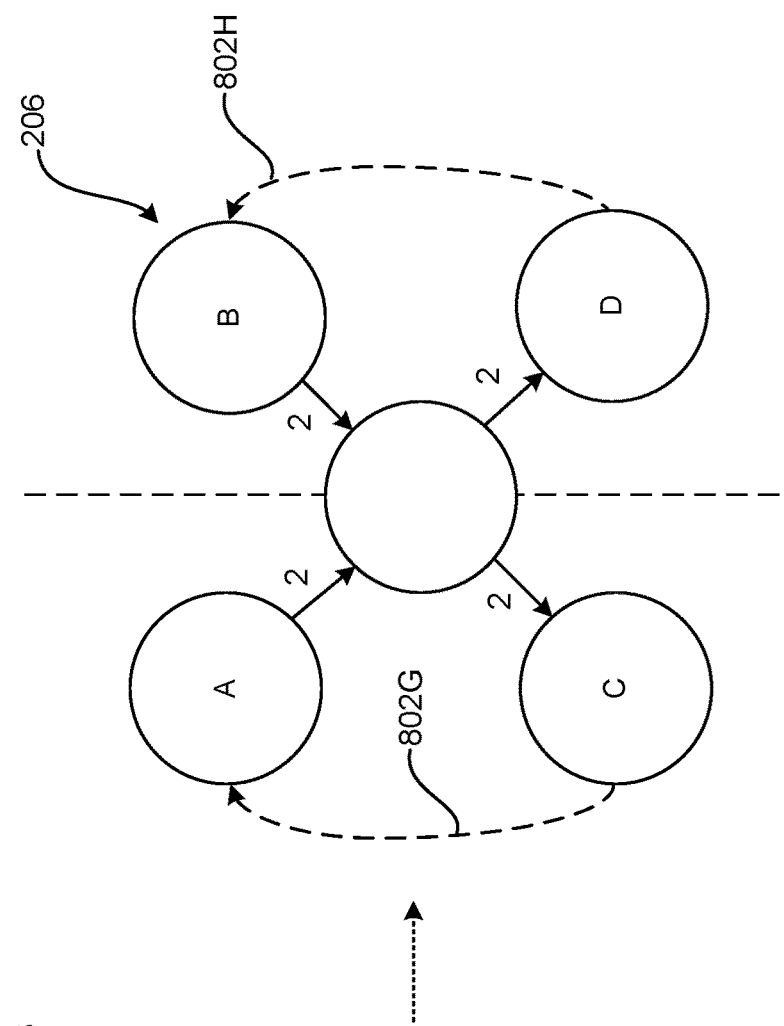
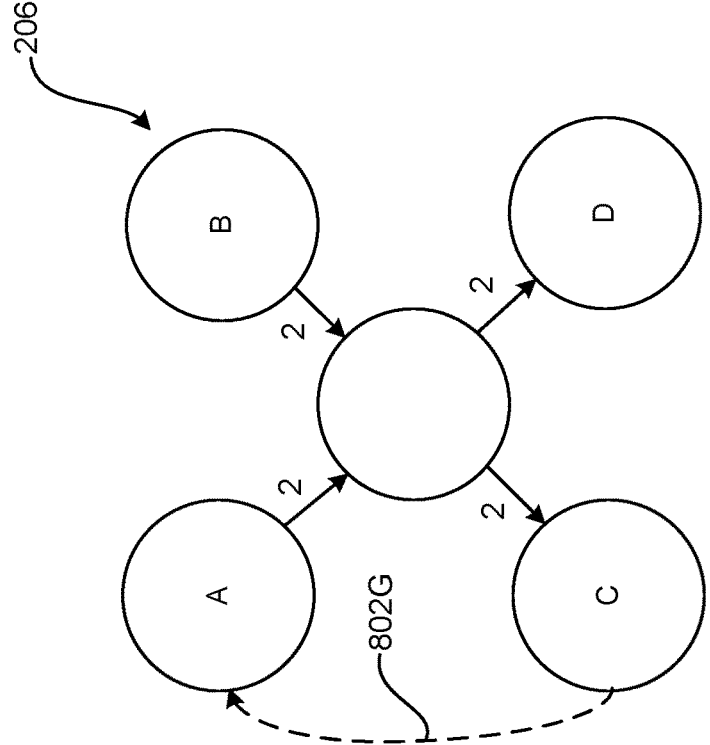
FIG. 12
MAXIMUM BENEFIT TEST

EFFICIENT UTILIZATION OF SYNCHRONIZATION PRIMITIVES IN A MULTIPROCESSOR COMPUTING SYSTEM

BACKGROUND

Multiprocessor computing systems include multiple processors that work together to perform computations. For instance, a multiprocessor computing system might include a control processor and one or more other specialized processors, such as processors for performing scalar or vector operations, processors for performing matrix multiplications, and processors for performing direct memory access operations. The control processor issues commands to the other processors to perform processing operations.

In order to achieve better performance, a control processor in a multiprocessor computing system can issue commands to other processors asynchronously, meaning that the control processor does not wait for a processor to complete a command before issuing the next command. Issuing new commands without waiting for previously-issued commands to complete can improve the performance of a multiprocessor computing system by enabling commands that are independent of one another to be executed concurrently on different processors.

There are, however, scenarios where commands are not independent and therefore cannot be executed by different processors at the same time. For example, a command for moving two operands into memory must be completed before a command to perform an arithmetic operation on the operands can begin.

Mechanisms exist for coordinating the asynchronous execution of commands in multiprocessor computing systems such as those described above. Typically, however, program code must be manually optimized to make use of these mechanisms. Manually optimizing a program to utilize these mechanisms can be very difficult and time consuming. Additionally, manual optimization can result in the suboptimal utilization of the computing resources utilized for coordinating the asynchronous execution of commands and, consequently, poor performance.

SUMMARY

Technologies are disclosed herein for efficient utilization of synchronization primitives in a multiprocessor computing system. Through implementations of the disclosed technologies, resources in a multiprocessor computing system used to coordinate asynchronous command execution, referred to herein as "synchronization primitives," can be utilized more optimally than previously possible, thereby resulting in improved execution performance. Moreover, through implementations of the disclosed technologies, program code can be optimized to efficiently utilize available synchronization primitives in an automated fashion, thereby eliminating the need for difficult and time consuming manual optimization. Other technical benefits not specifically mentioned herein might also be realized through implementations of the disclosed subject matter.

In order to provide aspects of the functionality disclosed herein, a compiler, such as a language compiler or a graph compiler, creates a dependency graph for a function in an input program. The dependency graph includes nodes corresponding to commands in the function and edges corresponding to dependencies between the nodes. The compiler identifies dependencies between the nodes using a shared queue analysis, an input/output analysis, an allocation overlap analysis, and/or another type of dependency analysis, according to various embodiments disclosed herein.

In an embodiment, the compiler also minimizes the edges corresponding to the dependencies between the nodes in the dependency graph. For example, and without limitation, the compiler adds artificial resource dependencies between consecutive pairs of nodes having the same command type and performs a forward reachability analysis on the dependency graph to eliminate redundant dependencies, in one embodiment. The compiler then adds edges to the dependency graph for dependencies remaining following the elimination of redundant dependencies.

In an embodiment, the compiler also adds a minimized set of back-edges to the dependency graph to enforce loop-carried resource dependencies in the input program. For example, and without limitation, the compiler can add a first back-edge from a leaf node to a root node of the dependency graph associated with a loop (e.g., the subset of the dependency graph for a function comprised only of the nodes/commands that are inside the loop for which the back edge is being added) and a second back-edge from the leaf node to another root node in the dependency graph associated with the loop.

The compiler then allocates synchronization primitives provided by a multiprocessor computing system to the commands in the function of the input program based on the edges in the dependency graph. For example, in an embodiment, the compiler allocates synchronization primitives provided by multiprocessor computing system to the commands in the function of the input program to optimally coordinate asynchronous execution of the commands. This allocation is performed in a manner that enables reuse of the synchronization primitives to maximize the efficient utilization of the limited pool of synchronization primitives made available by the multiprocessor computing system.

The above-described subject matter is implemented as a computer-controlled apparatus, a computer-implemented method, a processing system, or as an article of manufacture such as a computer readable storage medium in various embodiments disclosed herein. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 12 is a data structure diagram that illustrates aspects of a maximum benefit test utilized to determine the next root node/leaf node pair around which to add a back-edge in a dependency graph, according to an embodiment;

DETAILED DESCRIPTION

The following detailed description is directed to technologies for efficient utilization of synchronization primitives in a multiprocessor computing system. As discussed briefly above, implementations of the disclosed technologies enable synchronization primitives in a multiprocessor computing system to be utilized more optimally than previously possible, thereby resulting in improved execution performance. Moreover, through implementations of the disclosed technologies, program code can be optimized to efficiently utilize available synchronization primitives in an automated fashion, thereby eliminating the need for difficult and time consuming manual optimization. Other technical benefits not specifically mentioned herein might also be realized through implementations of the disclosed subject matter.

Figure 1:
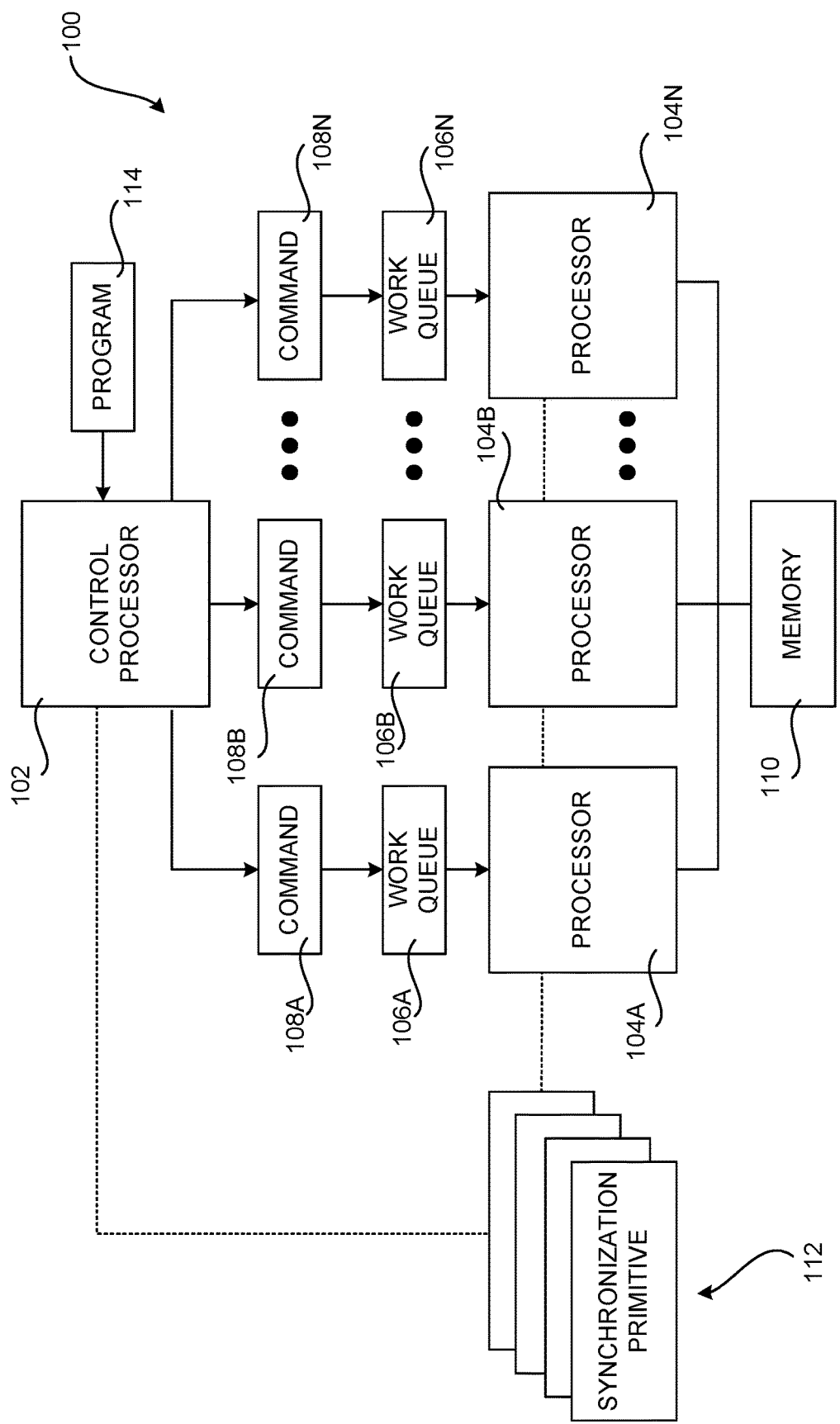
FIG. 1 is a computing system diagram illustrating aspects of a multiprocessor computing system that provides an illustrative operating environment for aspects of the technologies disclosed herein, according to an embodiment.

FIG. 1 is a computing system diagram illustrating aspects of a multiprocessor computing system 100 that provides an illustrative operating environment for aspects of the technologies disclosed herein, according to an embodiment. In this regard, it is to be appreciated that the multiprocessor computing system 100 shown in FIG. 1 has been simplified for ease of discussion. The multiprocessor computing system 100 can include other components not specifically shown in FIG. 1, might not include all of the components shown in FIG. 1, or might be implemented using a different architecture than illustrated in FIG. 1.

As discussed briefly above, multiprocessor computing systems, such as the multiprocessor computing system 100 shown in FIG. 1, include multiple processors that work together to perform computations. For example, in the illustrated embodiment, the multiprocessor computing system 100 includes a control processor ("CP") 102 and one or more other specialized processors 104A-104N (which might be referred to herein collectively as "the processors 104"). The processors 104 can be processors for performing scalar or vector operations, processors for performing matrix multiplications, processors for performing direct memory access ("DMA") operations, or processors for performing other types of computations and operations.

In an embodiment, the processors 104 have associated work queues 106A-106N (which might be referred to herein collectively as "the work queues 106"), respectively. The work queues 106 are external to the processors 104 in the embodiment shown in FIG. 1. It is to be appreciated, however, that the work queues 106 might be internal to the processors 104 or implemented in another location in other embodiments. The work queues 106 can be implemented in either hardware, software, or a combination of hardware and software, according to embodiments.

During execution of a program 114, the CP 102 sends commands 108A-108N (which might be referred to herein collectively as "commands 108") to the processors 104, respectively, to perform operations specified by the program 114. For example, in an embodiment, the CP 102 places the commands 108 on the respective work queues 106 of the processors 104. The processors 104, in turn, dequeue the commands 108 from their respective work queues 106 and perform the specified commands 108 independently.

The CP 102 in the multiprocessor computing system 100 can issue commands 108 to the processors 104 asynchronously, meaning that the CP 102 does not wait for a command 108 to complete before issuing the next command 108. Issuing new commands 108 without waiting for previously-issued commands 108 to complete can improve the performance of the multiprocessor computing system 100 by enabling commands 108 that are independent of one another to be executed concurrently on different processors 104.

As discussed above, there are scenarios where commands 108 are not independent and therefore cannot be executed at the same time. For example, a command 108 for moving two operands from a host memory into a memory 110 of the multiprocessor computing system 100 must be executed before a command 108 to perform an arithmetic operation on the operands can begin. Another example is the case where the memory ranges utilized by two commands 108 overlap. In this scenario the commands 108 cannot be executed at the same time because they may overwrite memory locations currently in use by one another. In this regard, it is to be appreciated that although only a single memory 110 that is shared by the processors 104A-104N is shown in FIG. 1, each processor 104 may have its own memory 110, according to embodiments.

As also discussed briefly above, mechanisms exist for coordinating the execution of commands 108 in multiprocessor computing systems such as that shown in FIG. 1 in order to optimize asynchronous execution of commands 108. Typically, however, a program 114 must be manually optimized to make use of these mechanisms, which can be very difficult and time consuming. Additionally, manual optimization can result in the sub-optimal utilization of the computing resources utilized for coordinating execution of commands 108 and, consequently, poor performance.

In order to address the technical limitations of the previous solutions described above, and potentially others, the multiprocessor computing system 100 is configured with synchronization primitives 112. The synchronization primitives 112 are software or hardware resources that can be signaled or waited on to coordinate asynchronous execution of commands 108. In an embodiment, the synchronization primitives 112 are semaphores, which are variables or abstract data types that are used to control access to a common resource, such as the memory 110. It is to be appreciated, however, that other types of synchronization primitives 112 can be utilized in other embodiments, such as mutexes, barriers, spinlocks, or other types of locks.

As will be described in greater detail below, the technologies disclosed herein can automatically determine an optimal utilization of the synchronization primitives 112 for asynchronous execution of the commands 108 in a program 114, thereby resulting in improved execution performance as compared to previous solutions that rely on manual optimization. Moreover, through implementations of the disclosed technologies, a program 114 can be optimized to efficiently utilize available synchronization primitives 112 in an automated fashion, thereby eliminating the need for difficult and time consuming manual optimization. Details regarding these aspects will be provided below with respect to FIGS. 2-13.

Figure 2:
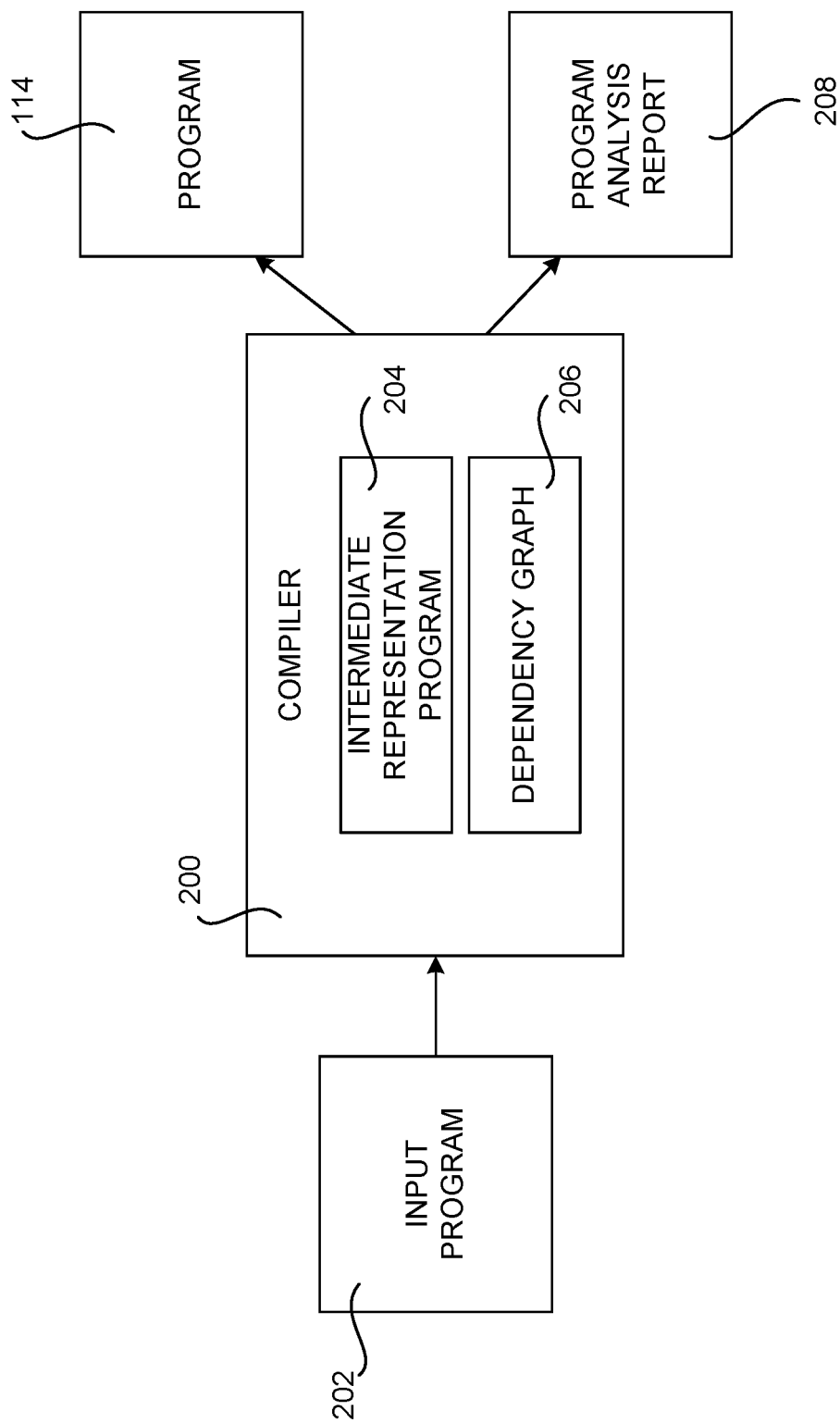
FIG. 2 is a software architecture diagram illustrating aspects of the configuration and operation of a compiler utilized to provide aspects of the functionality disclosed herein, according to an embodiment.

FIG. 2 is a software architecture diagram illustrating aspects of the configuration and operation of a compiler 200 utilized to provide aspects of the functionality disclosed herein, according to an embodiment. The compiler 200 is a graph compiler in one embodiment. It is to be appreciated, however, that the compiler 200 might be a language compiler or another type of compiler in other embodiments. Additionally, other types of program components can be configured to provide the functionality disclosed herein as being performed by the compiler 200 in other embodiments such as, for example, non-compiler analysis tools.

As shown in FIG. 2, an input program 202 that has not been optimized for optimal asynchronous execution of commands 108 on the multiprocessor computing system 100 is provided to the compiler 200 in an embodiment. The input program 202 includes functions that issue commands 108 to the processors 104 in the manner described above with regard to FIG. 1. The input program 202 may be expressed using a programming language such as, but not limited to, TRITON, C, C#, or PYTHON. The input program 202 can be expressed using other programming languages in other embodiments.

In an embodiment, the output of the compiler 200 is a program 114 that has been optimized for optimal asynchronous execution of commands 108 on the multiprocessor computing system 100. In another embodiment, the compiler 200 or another type of program outputs a program analysis report 208 that specifies how the input program 202 is to be modified for optimized asynchronous execution of commands 108 in the input program 202 on the multiprocessor computing system 100. The compiler 200 or other type of program provides other types of output in other embodiments.

In order to optimize the input program 202 for asynchronous execution, the compiler 200 creates a dependency graph 206 for a function in the input program 202 by traversing the IR program 204 for the function. The IR program 204 is a data structure or other type of code used internally by the compiler 200 to represent the input program 202. The IR program 204 is expressed using Multi-Level Intermediate Representation ("MLIR") in one embodiment. The compiler 200 utilizes other types of IR in other embodiments.

During the traversal of the IR program 204 for a function, the compiler 200 creates nodes and edges between the nodes in the dependency graph 206. The dependency graph 206 encodes the commands 108 for the function along with references to synchronization primitives 112 provided by the multiprocessor computing system 100 for optimizing the asynchronous execution of the commands 108.

More particularly, the compiler 200 creates nodes in the dependency graph 206 for the commands 108 in the function that require synchronization, such as commands 108 issued by the CP 102 to the processors 104 for performing scalar or vector operations, for performing matrix multiplications, for performing DMA operations, or commands 108 for performing other types of computations or operations. The compiler 200 creates a root node in the dependency graph 206 that represents incoming dependencies from outside the function and another node that captures outgoing dependencies.

The edges in a dependency graph 206 represent a synchronization primitive 112 (e.g., semaphores, mutexes, barriers, spinlocks, or other types of locks) that is signaled by a source command 108 represented by a source node and waited on by a destination command 108 represented by a destination node. The dependencies represented by the edges may be classified as either data dependencies between commands 108 (e.g., when the output of a command 108 is used as the input of another command 108) or resource dependencies (e.g., when two commands 108 operate on a buffer with the same memory address). The compiler 200 can utilize multiple analyses to determine the dependencies between nodes in a dependency graph 206, examples of which are described below with respect to FIGS. 4A-5.

An edge corresponding to a data dependency is added to the dependency graph 206 when a source command 108 shares an input or an output with a destination command 108. An edge in a dependency graph 206 that represents a data dependency specifies the value that it represents. Multiple edges with the same value may exist if there is a data dependency on a value feeding two or more dependent nodes. An edge corresponding to a resource dependency does not have an associated value.

An edge corresponding to a resource dependency can specify a memory resource dependency, a synchronization primitive dependency, or a dependency upon another type of resource. An edge specifying a memory resource dependency is added to the dependency graph 206 when a source command 108 and a destination command 108 read or write to memory regions that overlap.

An edge specifying a synchronization primitive dependency is added to the dependency graph 206 for commands 108 that are part of a loop to avoid two independent loop iterations from signaling the same synchronization primitive 112 at the same time. As described in greater detail below, the edges in a dependency graph 206 are generally forward edges, with the exception of edges corresponding to synchronization primitive dependencies, which are back-edges.

A node in the dependency graph 206 for a function may be simultaneous or non-simultaneous. A simultaneous node signals all of its output synchronization primitives 112 at the same time, whereas a non-simultaneous node may signal its output synchronization primitives 112 independently.

Once the dependency graph 206 has been created and optimized for all of the functions in the input program 202, the compiler 200 allocates a synchronization primitive 112 for each edge in the dependency graph 206 and attached to the corresponding commands 108 in the IR program 204. The IR program 204 can then be compiled to generate the optimized output program 114. Additional details regarding the functionality described briefly above with respect to FIG. 2 will be provided below with respect to FIGS. 3-13.

Figure 3:
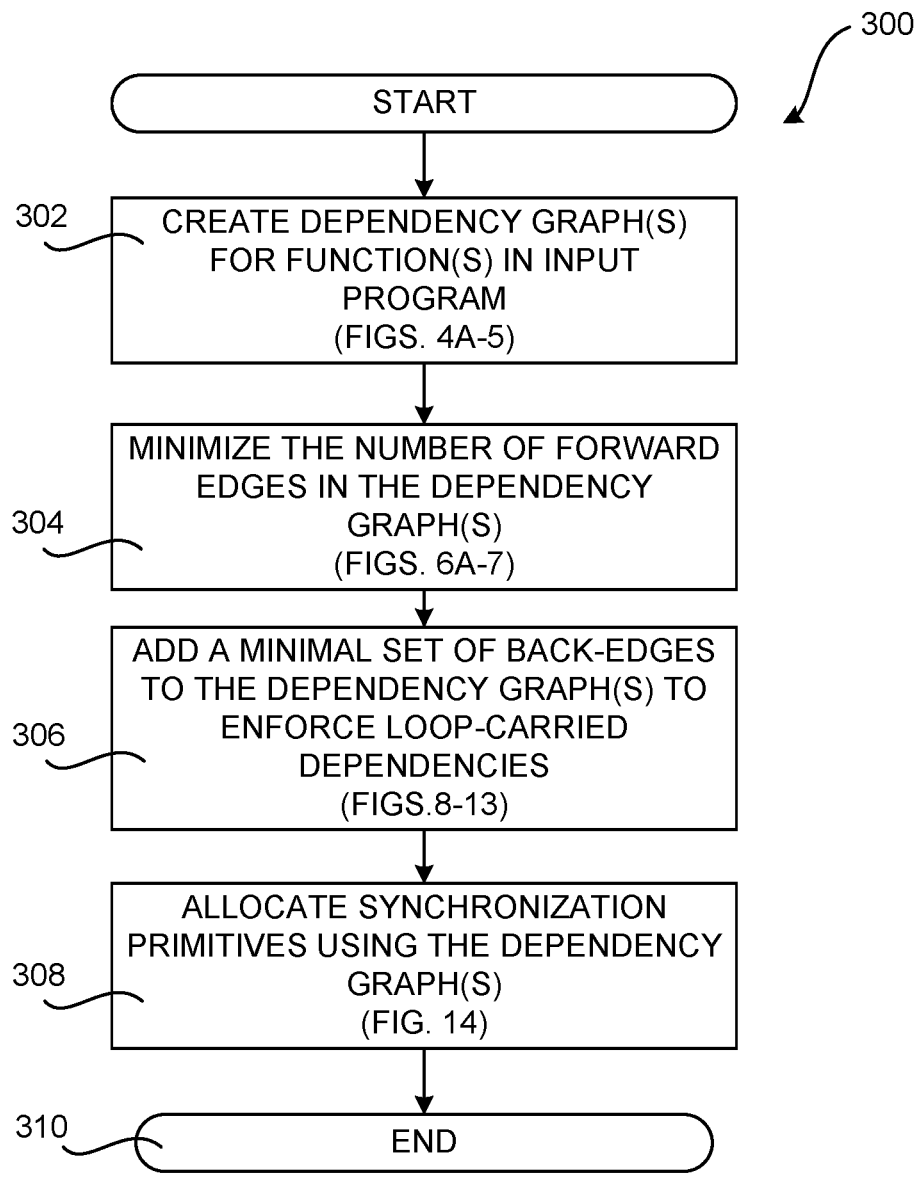
FIG. 3 is a flow diagram showing a routine that that provides an overview of a mechanism disclosed herein for efficiently utilizing synchronization primitives in a multiprocessor computing system, according to an embodiment.

FIG. 3 is a flow diagram showing a routine 300 that provides an overview of a mechanism disclosed herein for enabling efficient utilization of synchronization primitives 112 in a multiprocessor computing system 100, according to an embodiment. The routine 300 begins at operation 302, where the compiler 200 creates dependency graphs 206 for the functions in an input program 202. Utilization of dependency graphs 206 to represent dependencies between asynchronous functions in an input program 202 enables the optimizations described below with reference to FIGS. 4A-15B, which enable synchronization primitives to be utilized more optimally than previously possible, thereby resulting in improved execution performance of the input program 202. Previous solutions, such as working directly with MLIR with dominance tests, cannot provide support for the optimizations described below.

As discussed briefly above, in order to create the dependency graphs 206, the compiler 200 can utilize multiple different analyses to determine the dependencies between nodes in the dependency graphs 206. In an embodiment, the compiler 200 determines the dependencies between nodes in the dependency graphs 206 utilizing a shared queue analysis (described below with respect to FIG. 4A), an input/output analysis (described below with respect to FIG. 4B), and an allocation overlap analysis (described below with respect to FIG. 4C). The compiler utilizes alternate or additional types of analyses to identify the dependencies between nodes in a dependency graph 206 in other embodiments.

In an embodiment, each of the analyses utilized to identify the dependencies between nodes in a dependency graph 206 operates in isolation. As a result, there may be redundant or duplicate dependencies added to a dependency graph 206. In an embodiment, the redundant or duplicate dependencies are optimized by the compiler 200 at operation 304.

The compiler 200 can minimize the number of forward edges 404 in the dependency graph 206 using the mechanism described below with regard to FIG. 7. The mechanism described with reference to FIG. 7 makes it easy to extend the compiler 200 with different components for performing dependency identification without requiring each component to guarantee that the dependencies they identify are globally optimal. FIGS. 6A-6C show examples illustrating how the mechanism shown in FIG. 7 can add an edge between commands of the same queue (i.e., via the disclosed shared queue analysis) in order to identify all cases of redundant forward edges.

From operation 304, the routine 300 proceeds to operation 306, where the compiler 200 adds a minimal set of back-edges to the dependency graphs 206 to enforce loop-carried dependencies. Details regarding this aspect are provided below with respect to FIGS. 8-13.

From operation 306, the routine 300 proceeds to operation 308, where the compiler 200 allocates synchronization primitives 112 to the input program 204 based on the contents of the dependency graph 206 created at operations 302-306. Details regarding this aspect are provided below with regard to FIG. 14. From operation 308, the routine 300 proceeds to operation 310, where it ends.

Creating a Dependency Graph

Figure 4A:
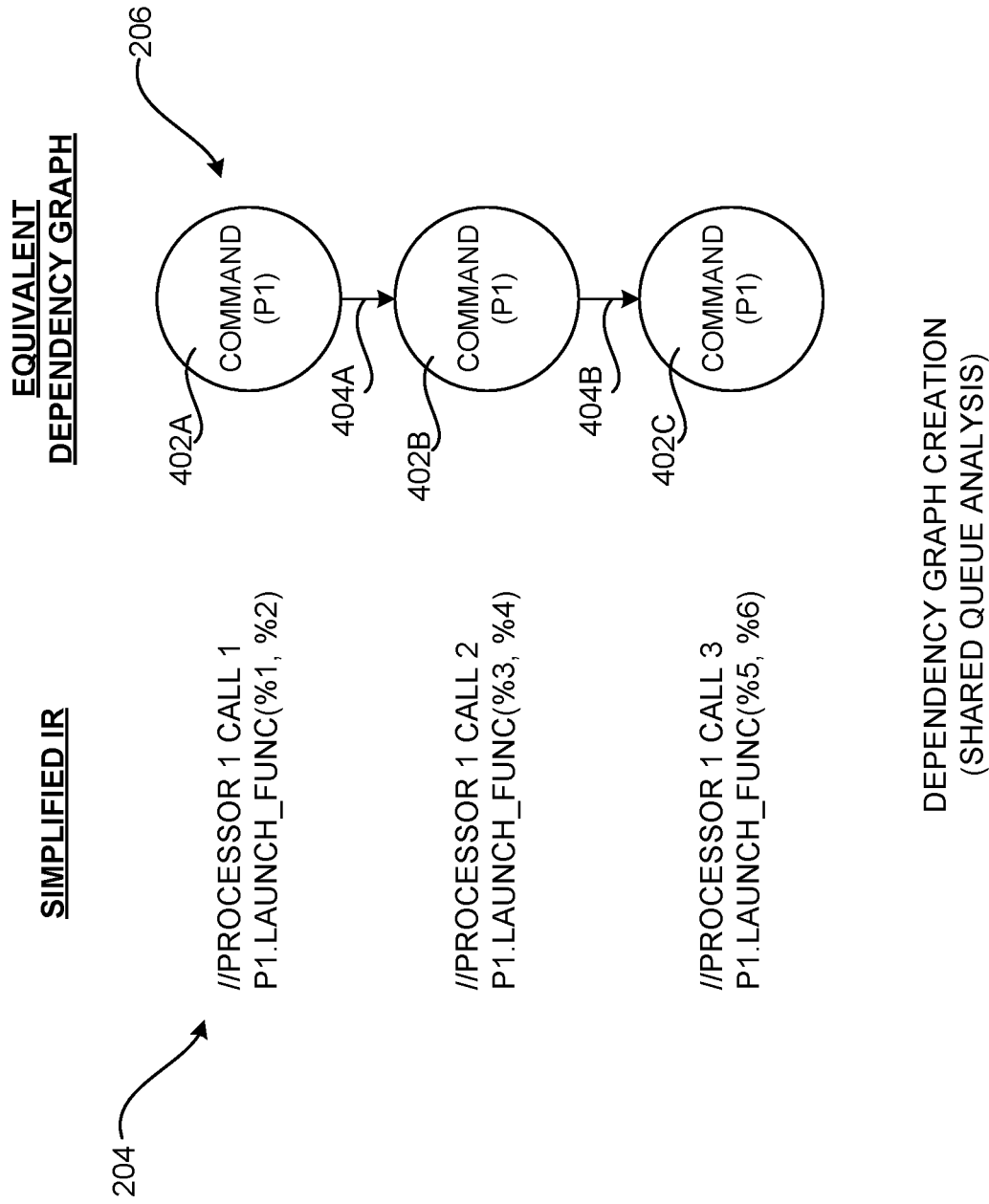
FIG. 4A is a data structure diagram that illustrates aspects of one mechanism disclosed herein for determining the dependencies between commands in an intermediate representation program utilizing a shared queue analysis, according to an embodiment.

FIG. 4A is a data structure diagram that illustrates aspects of a mechanism for determining the dependencies between commands 108 in a function of an IR program 204 utilizing a shared queue analysis, according to an embodiment. In an embodiment, commands 108 of the same type are placed in the same work queue 106, where they are executed one after the other in a first-in-first-out ("FIFO") order. This shared use of the work queues 106 creates resource dependencies between each command 108 of the same type.

To model a dependency resulting from the utilization of a shared work queue 106, the compiler 200 performs a shared queue analysis. The shared queue analysis creates a resource dependency edge 404 between a current node 402 and the most recent node 402 in the dependency graph 206 corresponding to the same command type.

The example segment of a dependency graph 206 shown in FIG. 4A illustrates aspects of the shared queue analysis described above. In particular, the simplified IR 204 shown in FIG. 4A includes three commands 108. The corresponding dependency graph 206, therefore, includes three nodes 402A-402C, which correspond to the three commands 108, respectively. Because the commands 108 are of the same type, the compiler 200 adds an edge 404A between nodes 402A and 402B and an edge 404B between the nodes 402B and 402C.

It is to be appreciated that the use of synchronization primitives 112 is not required to enforce shared queue dependencies in embodiments where the multiprocessor computing system 100 enforces a FIFO order of execution of commands 108 in the work queues 106. As will be described in greater detail below, however, defining shared queue dependencies in the dependency graph 206 can help to identify redundant dependencies (i.e., edges 404) in the dependency graph 206.

Figure 4B:
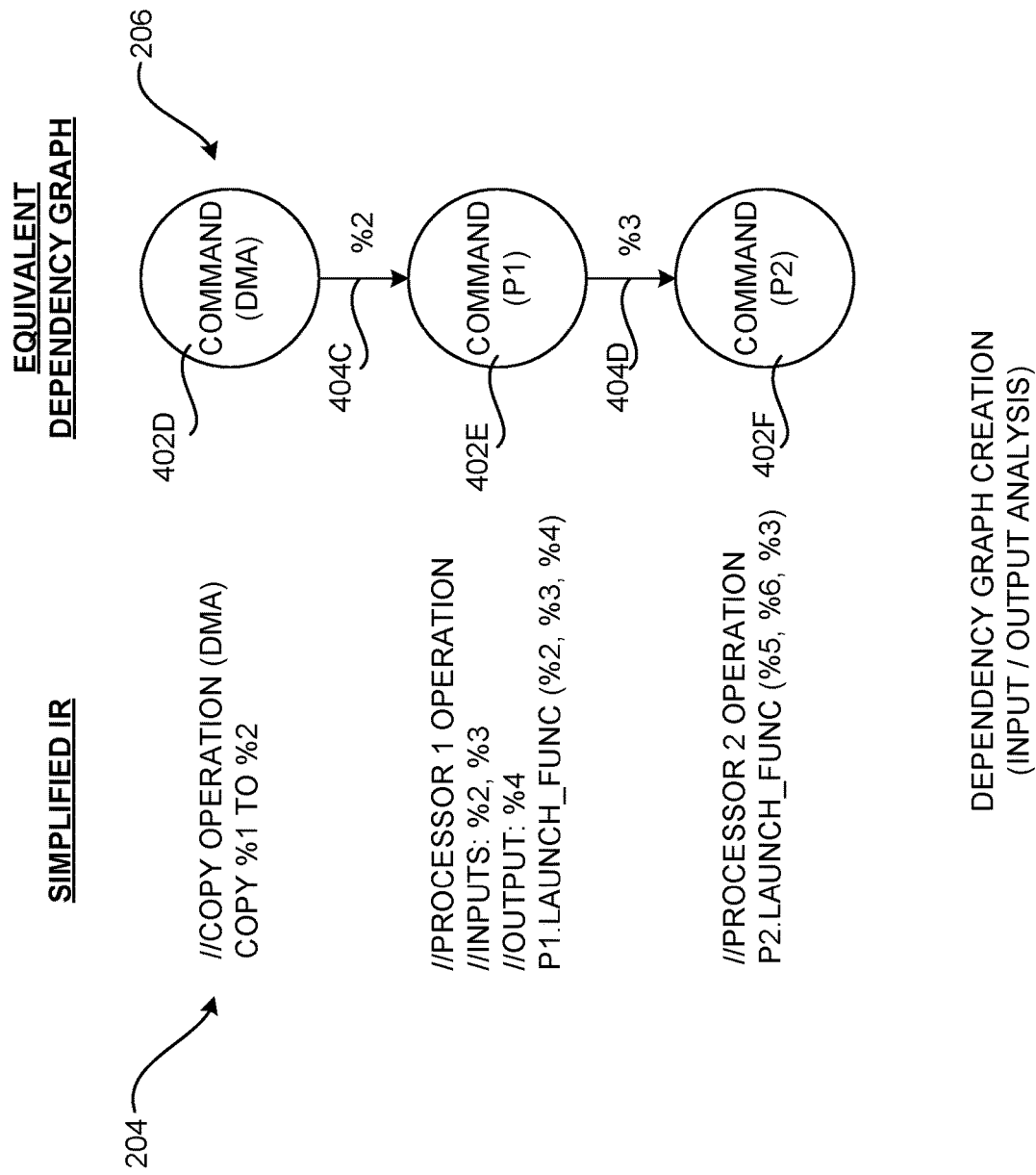
FIG. 4B is a data structure diagram that illustrates aspects of one mechanism disclosed herein for determining the dependencies between commands in an intermediate representation program utilizing an input/output analysis, according to an embodiment.

FIG. 4B is a data structure diagram that illustrates aspects of a mechanism for determining the dependencies between commands 108 in a function of an IR program 204 utilizing an input/output analysis, according to an embodiment. The input/output analysis illustrated in FIG. 4B identifies data dependencies between commands 108 based on uses (i.e., when a buffer is read) and definitions (i.e., when a buffer is written).

The input/output analysis performed by the compiler 200 accounts for three primary types of use-based dependencies: read after write; write after read; and write after write. In the case of a read after write dependency (which might also be referred to as "use after definition" dependencies), the compiler 200 adds a data dependency edge 404 to a node 402 in the dependency graph 206 corresponding to the most recent command 108 that defined a buffer.

The example segment of a dependency graph 206 shown in FIG. 4B illustrates aspects of the input/output analysis described briefly above. In the example shown in FIG. 4B, for instance, the command 108 represented by the node 402E reads the buffer that is the target of a copy command 108 associated with the node 402D. Accordingly, the compiler 200 adds a data dependency edge 404C between the nodes 402D and 402E to account for this data dependency. The value of the created data dependency edge 404C is set to the buffer involved in the dependency (i.e., % 2).

In the case of a write after read dependency (which might also be referred to as "definition after use" dependencies), the compiler 200 adds data dependency edges 404 to the nodes 402 in the dependency graph 206 that correspond to the most recent commands 108 that use a buffer since the buffer was last defined. In the example shown in FIG. 4B, for instance, a data dependency edge 404D has been added between the nodes 402E and 402F to account for the write of the buffer % 3 by the command 108 associated with node 402F following the read of the buffer % 3 by the command 108 associated with the node 402E.

In the case of write after write dependencies (which might also be referred to as "definition after definition" dependencies), the compiler 200 adds a dependency edge 404 to a node 402 corresponding to the most recent command 108 that defined a buffer. In one embodiment, for example, if no read exists since a buffer was last written, the compiler 200 adds a dependency edge 404 instead to the node 402 corresponding to the most recent command 108 that defined the buffer in order to account for write after write dependencies.

In an embodiment, only the most recent uses per work queue 106 are considered in order to reduce the number of edges 404 required. For example, if there are two commands 108 that use a buffer since its last definition, only the most recent command 108 is considered. Omitting the other command 108 is valid because the two commands 108 are intrinsically synchronized by the shared queue dependency in the manner described above.

Figure 4C:
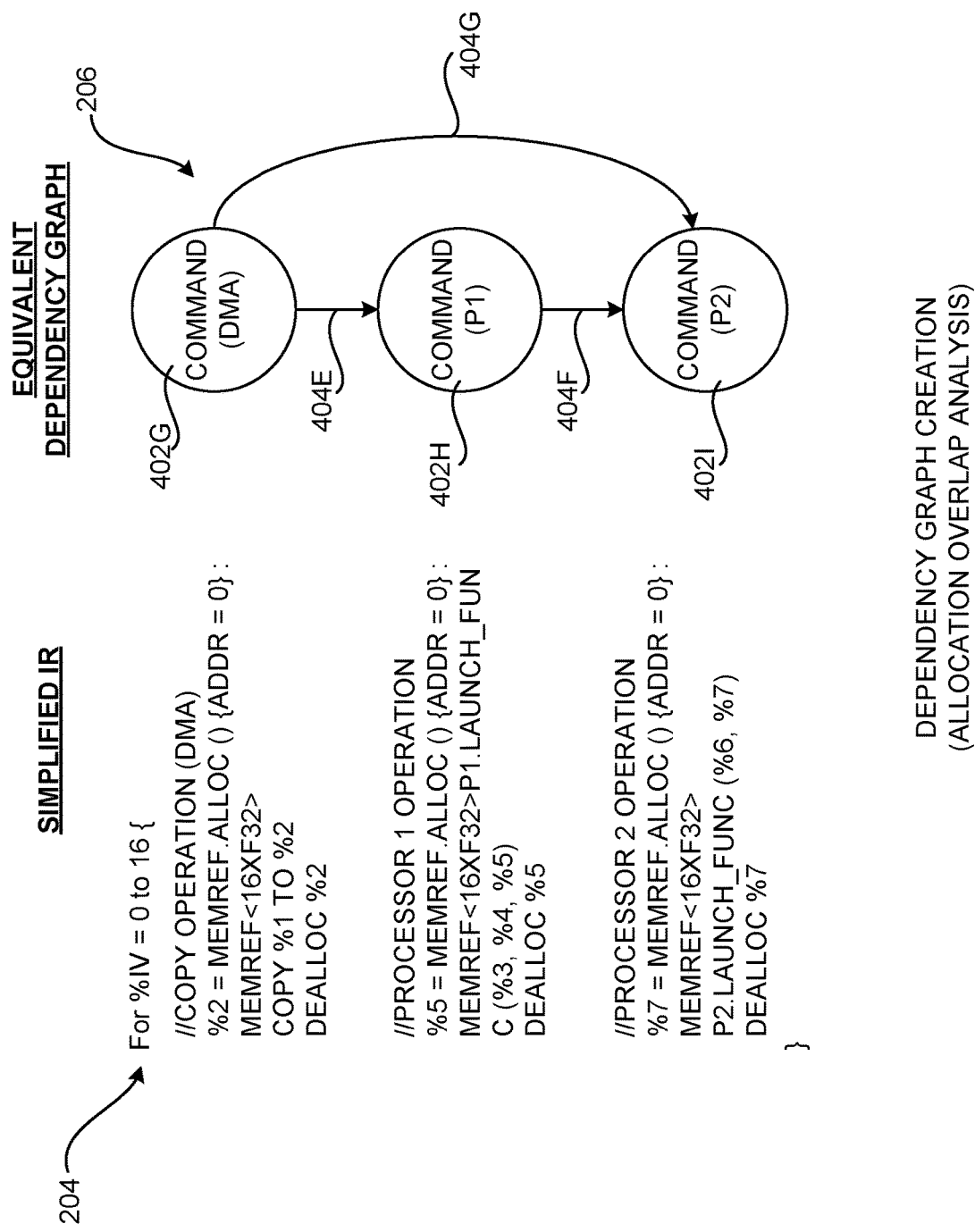
FIG. 4C is a data structure diagram that illustrates aspects of one mechanism disclosed herein for determining the dependencies between commands in an intermediate representation program utilizing an allocation overlap analysis, according to an embodiment.

FIG. 4C is a data structure diagram that illustrates aspects of a mechanism for determining the dependencies between commands 108 in a function of an IR program 204 utilizing an allocation overlap analysis, according to an embodiment. In an embodiment, the compiler 200 makes efficient use of the memory 110 by recycling previously used memory address ranges when allocating new buffers. In particular, in an embodiment the compiler 200 adds the resource dependency edges 404 between nodes 402 corresponding to commands 108 that share a range of memory addresses.

The example simplified IR 204 shown in FIG. 4C includes three commands. Accordingly, the example segment of a dependency graph 206 shown in FIG. 4C includes three nodes 402G-402I, each of which corresponds to a command 108 in the simplified IR 204. Additionally, because the commands 108 in the simplified IR 204 shown in FIG. 4C utilize overlapping ranges of memory addresses, the compiler 200 adds edges 404E, 404F, and 404G to the dependency graph 206 to reflect these dependencies.

It is to be appreciated that a resource dependency exists between each use of a range of memory addresses and all uses of any overlapping range in an entire function. In order to avoid O(N) behavior, in an embodiment the compiler 200 only adds edges 404 to a dependency graph 206 between nodes 402 corresponding to commands 108 utilizing a range of memory addresses and the nodes 402 corresponding to commands 108 with the most recent use of overlapping ranges and between nodes 402 corresponding to commands 108 that utilize a range and nodes 402 corresponding to commands 108 with the least recent use of an overlapping range of memory addresses in the current loop of the simplified IR 204, if any. This limited set of edges 404 is sufficient to conservatively represent forward and loop-carried allocation overlap dependencies.

Figure 5:
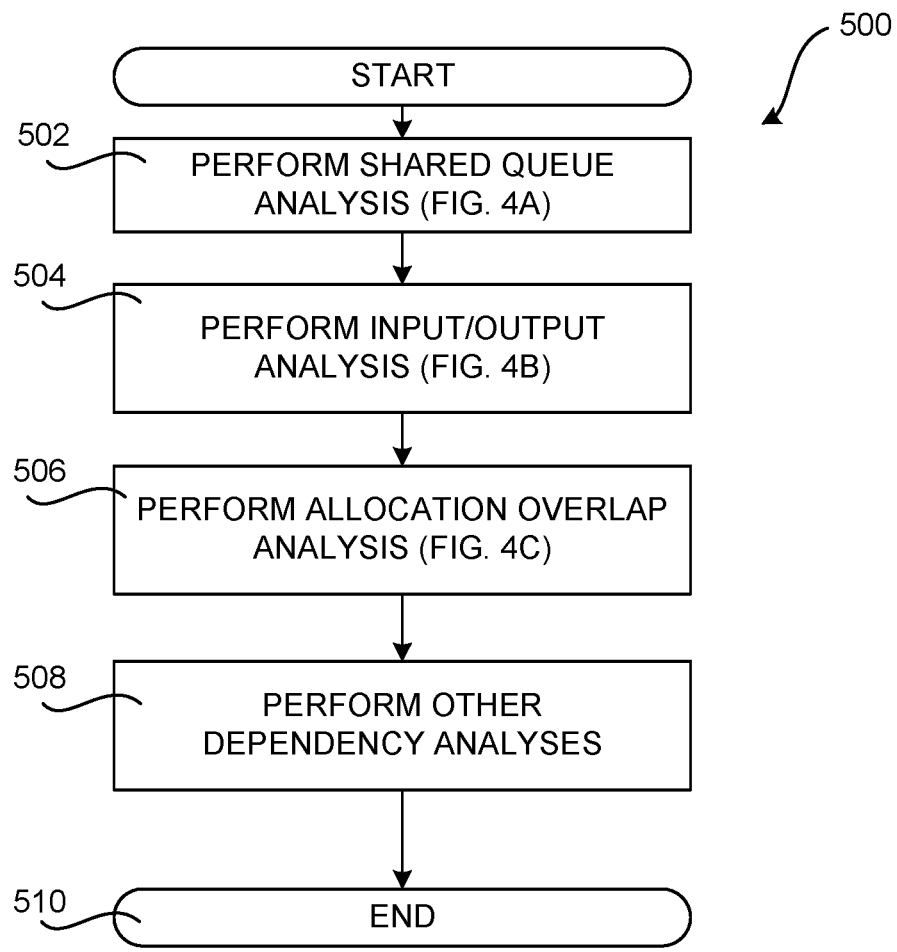
FIG. 5 is a flow diagram showing aspects of a routine for determining the dependencies between nodes in a dependency graph corresponding to commands in a function in an intermediate representation program, according to an embodiment.
Figure 6:
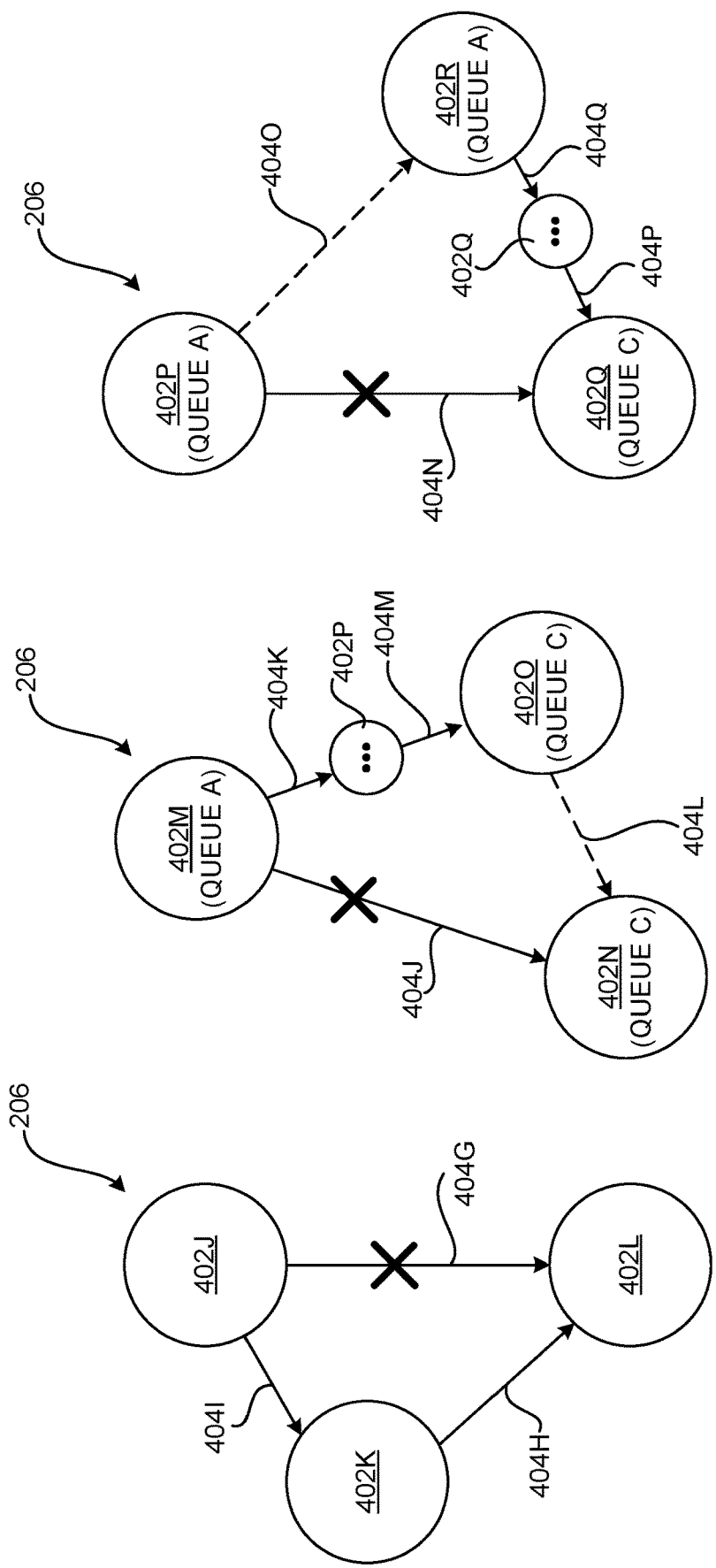
FIG. 6A is a data structure diagram that illustrates aspects of one mechanism disclosed herein for minimizing the number of forward dependencies in a dependency graph, according to an embodiment.
FIG. 6B is a data structure diagram that illustrates aspects of another mechanism disclosed herein for minimizing the number of forward dependencies in a dependency graph, according to an embodiment.
FIG. 6C is a data structure diagram that illustrates aspects of another mechanism disclosed herein for minimizing the number of forward dependencies in a dependency graph, according to an embodiment.

FIG. 5 is a flow diagram showing aspects of a routine 500 for determining the dependencies between nodes 402 in a dependency graph 206 corresponding to commands 108 in an IR program 204, according to an embodiment. The operations illustrated in FIG. 5 may be performed for all or a subset of the functions in an input program 202.

The routine 500 begins at operation 502, where the compiler 200 performs the shared queue analysis described above with respect to FIG. 4A to identify dependencies between commands 108 in a function of the IR program 204. In particular, and as discussed above, during the shared queue analysis the compiler 200 creates a resource dependency edge 404 between a current node 402 and the most recent node 402 in the dependency graph 206 corresponding to the same command type.

From operation 502, the routine 500 proceeds to operation 504, where the compiler 200 performs the input/output analysis described above with respect to FIG. 4B to identify dependencies between commands 108 in the IR program 204. In particular, and as discussed above, during the input/output analysis the compiler 200 identifies data dependencies between commands 108 based on uses (i.e., when a buffer is read) and definitions (i.e., when a buffer is written). The compiler 200 then adds dependency edges 404 between nodes 402 to account for the dependencies. The routine 500 then proceeds from operation 504 to operation 506.

At operation 506, the compiler 200 performs the allocation overlap analysis described above with respect to FIG. 4C to identify dependencies between commands 108 in the IR program 204. In particular, and as discussed above, the compiler 200 adds resource dependency edges 404 between nodes 402 corresponding to commands 108 that share a range of memory addresses.

From operation 506, the routine 500 then proceeds from operation 506 to operation 508, where the compiler 200 may perform one or more other dependency analyses to identify dependencies between commands 108 in a function of an IR program 204. From operation 508, the routine 500 proceeds to operation 510, where it ends.

As discussed above, the analyses performed at operations 502-508 to identify the dependencies between nodes 402 in a dependency graph 206 operate in isolation in an embodiment. As a result, there may be redundant or duplicate dependencies added to a dependency graph 206. In an embodiment, the redundant or duplicate dependencies are optimized by the mechanism described below with regard to FIG. 7. As mentioned above, this mechanism makes it easy to extend the compiler 200 with different components for performing dependency identification without requiring each component to guarantee that identified dependencies are globally optimal.

Optimizing Forward Dependencies in a Dependency Graph

As discussed briefly above, once a dependency graph 206 has been created in the manner described above with regard to FIGS. 4A-5, the synchronization primitives 112 required to enforce forward dependencies (i.e., dependencies that do not span multiple iterations of a loop) can be determined by analyzing the dependency graph 206. Since the dependency graph 206 for a function describes the forward dependencies between commands 108, one approach to allocating synchronization primitives 112 for these dependencies is to generate one synchronization primitive 112 per edge 404 in the dependency graph 206. This approach, however, may lead to the use of more synchronization primitives 112 than necessary.

To minimize utilization of the synchronization primitives 112, which may be limited in number, embodiments disclosed herein eliminate redundant forward edges 404 in the dependency graph 206. One synchronization primitive 112 is then allocated for each edge 404 that remains.

According to embodiments, edges 404 can be eliminated from a dependency graph 206 where multiple valid dependency paths exist between nodes 402, where a node 402 lexicographically follows another node 402 that shares the same work queue 106, and where a target node 402 is descendant from another node 402, which lexicographically follows and shares the same work queue 106 as a parent node 402. Examples illustrating how the mechanism shown in FIG. 7 and described below can add an edge 404 between commands of the same queue (i.e., via the disclosed shared queue analysis) in order to identify all cases of redundant forward edges are described below with respect to FIGS. 6A-6C.

In the example shown in FIG. 6A, a segment of an example dependency graph 206 includes nodes 402J-402L and edges 404G-404I. In this example, the edge 404G can be eliminated from the dependency graph 206, as indicated by the "X" in FIG. 6A, because another valid dependency path exists between the nodes 402J and 402L (i.e., the path from node 402J to 402L by way of the edges 404I and 404H). In this way, edges 404 are removed from the dependency graph 206 where there exists another valid dependency path between two nodes 402 being considered.

In the example shown in FIG. 6B, a segment of another example dependency graph 206 includes nodes 402M-402P and edges 404L-404M. The edge 404L is an implicit edge that has been added to the dependency graph 206 between nodes using the same queue (i.e., work queue "C" in the illustrated example).

In the example shown in FIG. 6B, the edge 404J can be eliminated from the segment of the dependency graph 206, as indicated by the "X" in FIG. 6B, because node 402N lexicographically follows node 402O and the nodes 402N and 402O share the same work queue 106. Because commands 108 placed in the work queues 106 are implicitly ordered in the manner described above, it follows that the command 108 associated with the node 402N will not be able to execute prior to the previous node 402O sharing the same work queue 106, and thus the edge 404J between parent (i.e., the node 402M) and child (i.e., the node 402N) is redundant and can be removed from the dependency graph 206.

A segment of another example dependency graph 206 is illustrated in FIG. 6C that includes nodes 402P-402R and edges 404N-404Q. The edge 404O is an implicit edge that has been added to the dependency graph 206 between nodes using the same queue (i.e., work queue "A" in the illustrated example). In this example, the edge 404N can be eliminated from the segment of the dependency graph 206, as indicated by the "X" in FIG. 6C, because the target node 402Q of the edge 404N is descendant from the node 402R node, which lexicographically follows and shares the same work queue 106 (i.e., work queue "A" in the illustrated example) as the parent node 402P.

It is to be appreciated that, in an embodiment, the edge minimization mechanisms described above with respect to FIGS. 6A-6C consider an edge 404 redundant only if the existing path starts at an edge 404 signaled at the same time as the edge 404 being considered. For simultaneous nodes 402, this can be any edge 404. For non-simultaneous nodes, only data dependency edges 404 with the same value as the current edge 404 are considered, in an embodiment.

It is to be appreciated by using the shared queue analysis described herein, the "reachable node," "covered queue," and "superseded queue" cases do not need to be recognized separately. The resource dependencies that were added by the shared queue analysis make node 402N reachable from node 402O, and node 402R reachable from node 402P. As a result, all three cases (i.e., reachable node, covered queue, and superseded queue) can be detected simultaneously by using a forward reachability analysis. This analysis provides benefits over previous optimization techniques such as, but not limited to, greater computationally efficiency and accuracy.

Figure 7:
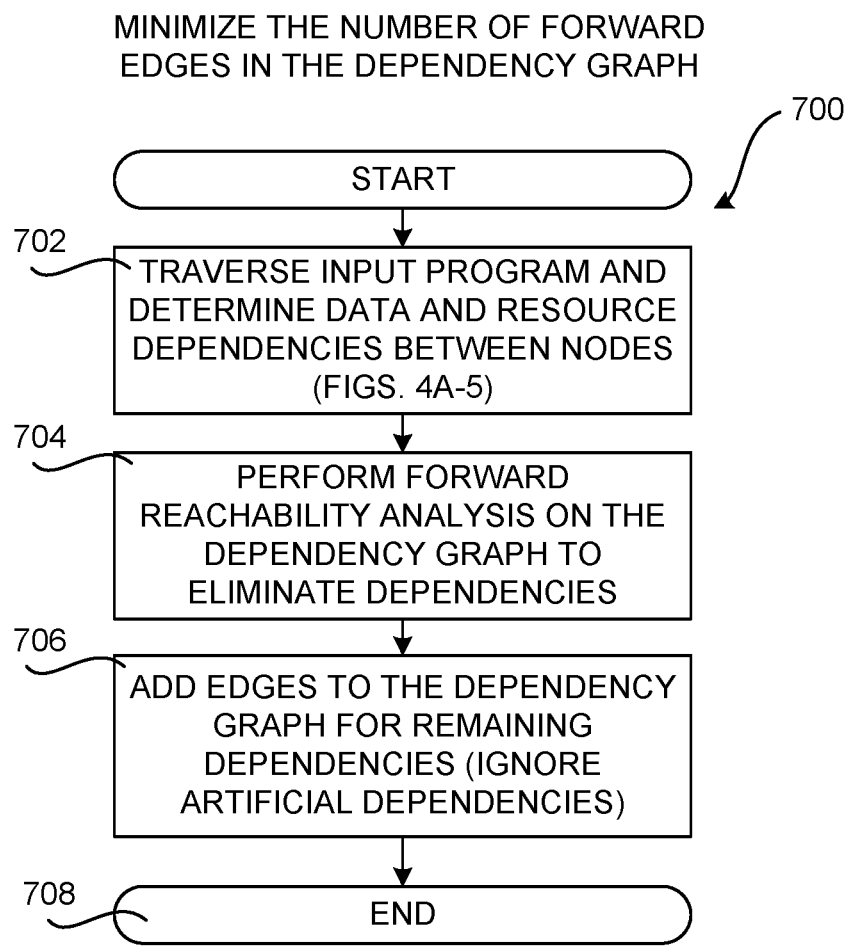
FIG. 7 is a flow diagram showing aspects of a routine for minimizing the number of forward dependencies in a dependency graph, according to an embodiment.
Figure 8:
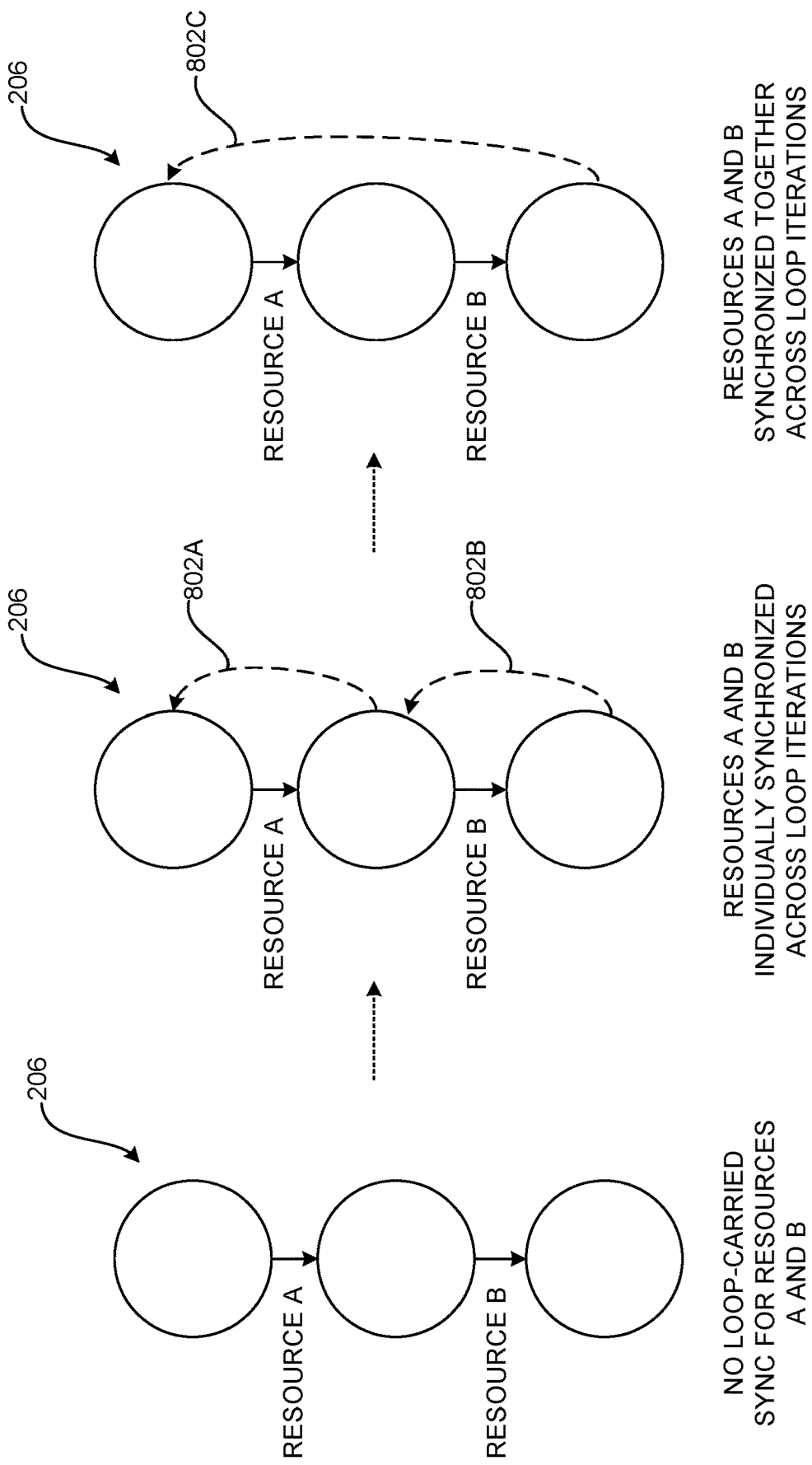
FIG. 8 is a data structure diagram that illustrates aspects of a mechanism disclosed herein for modeling loop-carried dependencies in a dependency graph, according to an embodiment.

FIG. 7 is a flow diagram showing aspects of a routine 700 for minimizing the number of forward dependencies in a dependency graph 206, according to an embodiment. The mechanism described below with regard to FIG. 7 minimizes the set of forward edges in the dependency graph 206 utilizing a modified reachability analysis. It is to be appreciated, however, that other mechanisms for minimizing the number of forward dependencies in the dependency graph 206 can be utilized in other embodiments such as, for example, transitive reduction algorithms.

The routine 700 begins at operation 702, where the input program 202 is traversed and the data and resource dependencies between nodes 402 are identified. An artificial resource dependency is also added between each consecutive pair of nodes of the same type. The artificial resource dependencies reflect the fact that commands of the same type are implicitly serialized because they are issued on the same work queue 106. One mechanism for identifying dependencies between nodes was described above with respect to FIGS. 4A-5. Other mechanisms can be utilized in other embodiments such as, for example, network flow algorithms.

From operation 702, the routine 700 proceeds to operation 704, where a forward reachability analysis is performed on the dependency graph 206. During the forward reachability analysis, edges 404 are eliminated if a source node 402 already reaches a destination node 402 via a different path through the dependency graph 206.

From operation 704, the routine 700 proceeds to operation 706, where edges 404 are added to the dependency graph 206 for the remaining dependencies that were not eliminated at operation 706. The artificial dependencies created at operation 702 are ignored during this operation. From operation 706, the routine 700 proceeds to operation 708, where it ends.

Enforcing Loop-Carried Resource Dependencies

Loops generated by an input program 202 generally do not include loop-carried data dependencies between iterations. However, loop-carried dependencies may still exist due to the use of shared hardware resources, such as memory addresses and synchronization primitives 112, across iterations.

As will be described in greater detail below, the mechanisms disclosed herein include algorithms to detect loop-carried dependencies and to generate an optimal set of synchronization primitives 112 to enforce them. The disclosed mechanisms can derive an optimal set of synchronization primitives 112 without user input, thereby eliminating the need for difficult and time consuming manual optimization. The disclosed mechanisms also optimize the derived set of synchronization primitives 112 set to avoid unnecessary use of the synchronization primitives 112 to achieve high performance.

Before discussing these algorithms, it is to be appreciated that a symmetrical relationship exists between loop-carried dependencies and forward dependencies. Consequently, every forward dependency in a loop has a corresponding loop-carried dependency.

Since all data and resource dependency edges 404 in a dependency graph 206 are synchronization primitives 112, it follows that all dependency edges 404 in a loop introduce a corresponding loop-carried dependency. Additionally, loop-carried dependencies involve the same nodes 402 as their corresponding forward dependencies, but in the opposite direction. For example, if a first node 402 has a dependency on a second node 402, the second node 402 will have a loop-carried dependency on the first node 402 that represents the resource being consumed by the second node 402 in the previous iteration of the loop.

One mechanism disclosed herein models loop-carried dependencies by adding a mirroring back-edge to each forward-edge 404 in the dependency graph 206 for a loop. In the example segment of a dependency graph 206 shown on the left-hand side of FIG. 8, for instance, there is no loop-carried synchronization for resources A and B. In the example shown in the middle of FIG. 8, resources A and B have been individually synchronized across loop iterations through the addition of back-edges 802A and 802B to the dependency graph 206.

In an embodiment, only the leaf and root nodes 402 of a loop subgraph are linked with a back-edge 802 to reduce the number of back-edges 802 required. In the example shown on the right-hand side of FIG. 8, for instance, resources A and B are synchronized together across loop iterations through the addition of a single back-edge 802C.

Figure 9:
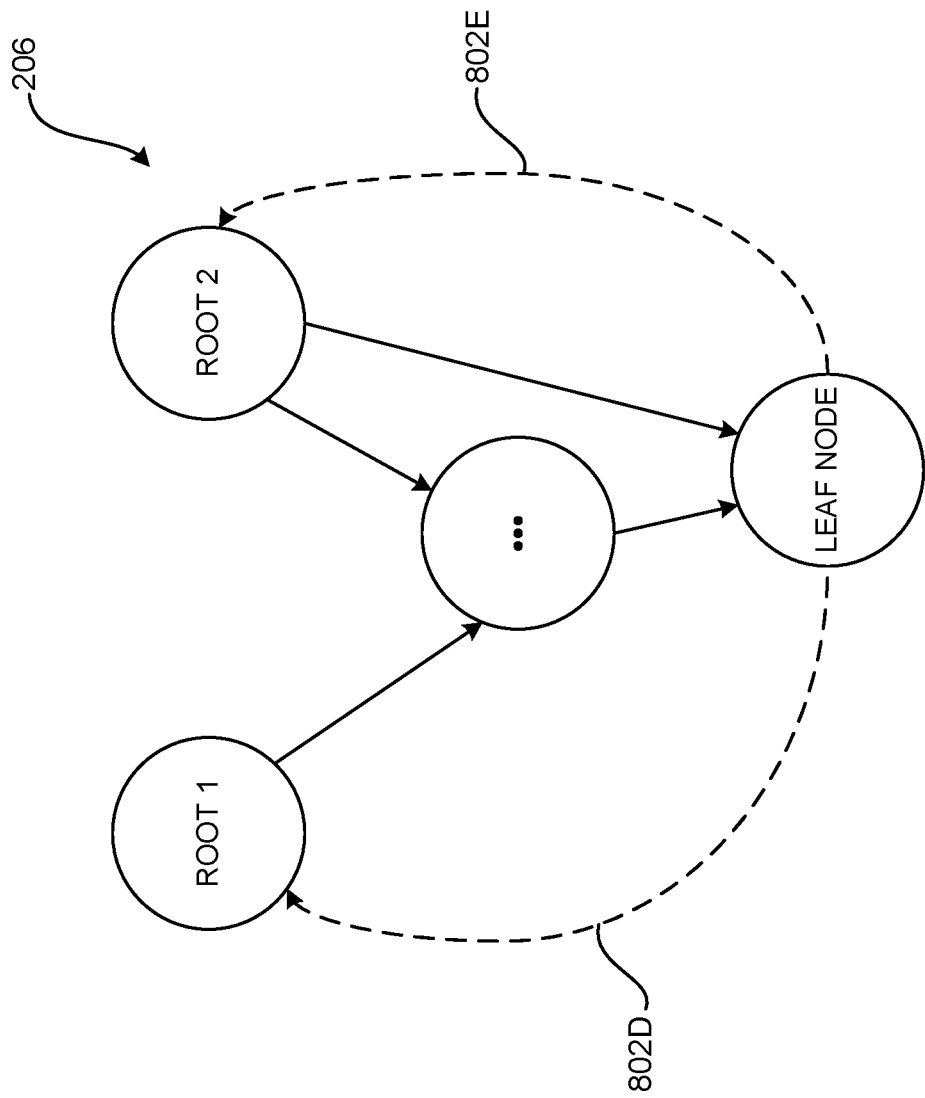
FIG. 9 is a data structure diagram that illustrates the addition of back-edges in a subgraph for a loop from a leaf node to several root nodes to model loop-carried dependencies, according to an embodiment.

In loop dependency graphs 206 (i.e., a subgraph comprised of the commands within a loop) with multiple root nodes 402 and leaf nodes 402, loop-carried dependency back-edges 802 are potentially needed from each leaf node 402 to each root node 402. These back-edges 802 represent the synchronization primitives 112 that commands 108 associated with root nodes 402 should wait on to prevent the current iteration of a loop from overwriting resources that are still in use by the previous iteration of the loop. For example, the illustrative segment of a loop dependency graph 206 shown in FIG. 9 illustrates the addition of a back-edge 802D from a from a leaf node to a first root node and the addition of a back-edge 802E from the leaf node to a second root node.

Optimizing the Loop-Carried Set of Synchronization Primitives

As discussed above, a back-edge 802 may need to be added between each root node/leaf node pair in the dependency graph 206 for a loop. However, some loop-carried dependencies may already be intrinsically synchronized due to the serial nature of same work queue 106 commands 108 that occur within the loop. In this scenario, adding a root node/leaf node pair back-edge 802 may make another back-edge 802 redundant.

In order to address the possibility described above, the mechanism disclosed herein for inserting synchronization primitives determines an optimal set of loop-carried synchronization primitives 112 by adding the minimum number of back-edges 802 such that all forward-edges 404 in the dependency graph 206 have their loop-carried dependency synchronized. In an embodiment, this is accomplished by a greedy algorithm that identifies the forward-edges 404 in the loop dependency graph 206 that have their loop-carried dependency intrinsically synchronized and removes them from consideration. Back-edges 802 are then added around a root node/leaf node pair until all of the forward-edges 404 have had their loop-carried dependencies synchronized. All other root node/leaf node pairs, if any, are ignored.

Intrinsically Synchronized Loop-Carried Dependencies

Figure 10:
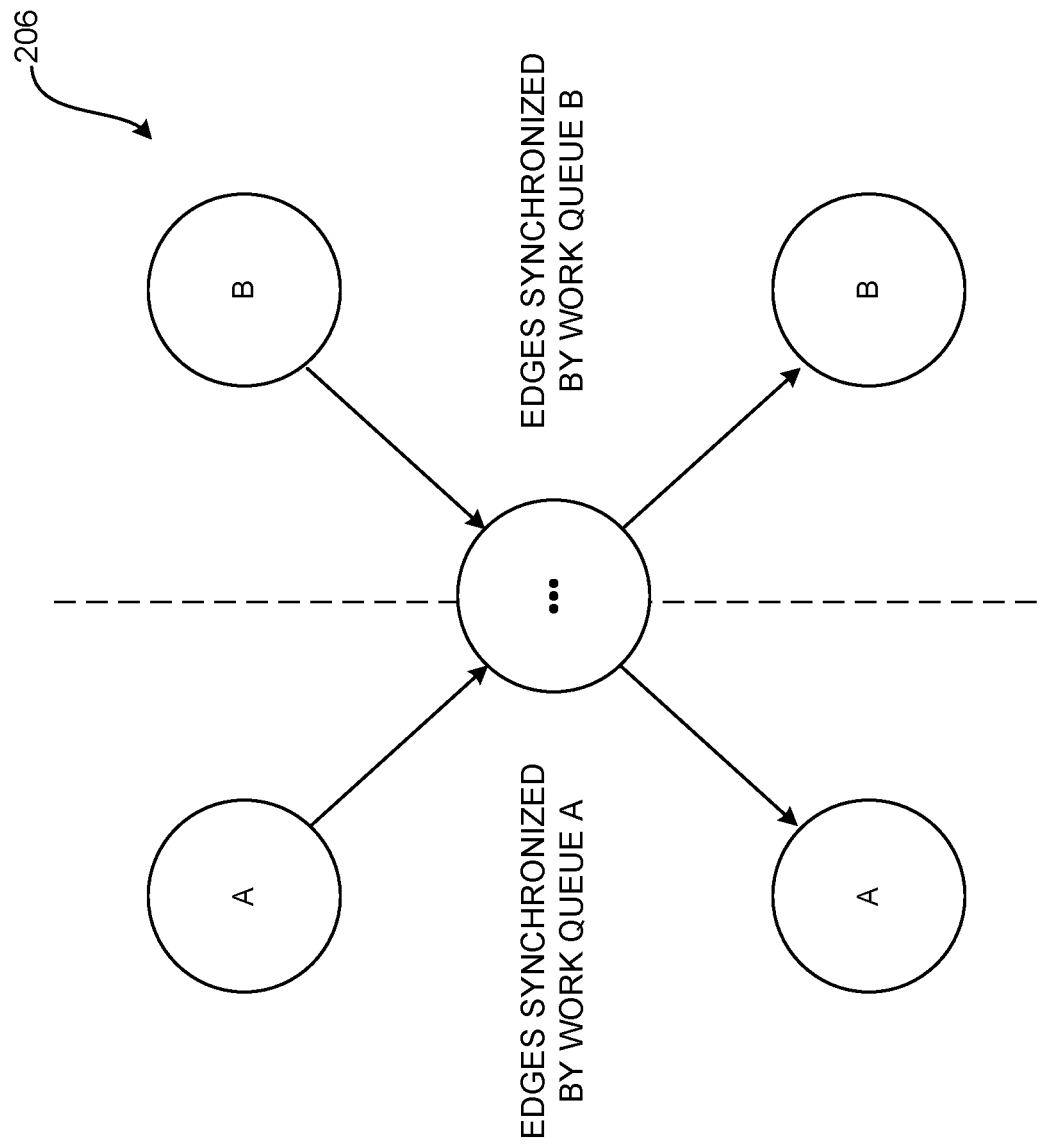
FIG. 10 is a data structure diagram that illustrates a scenario where it is not necessary to add back-edges to a dependency graph because all of the forward-edges in the dependency graph are between nodes associated with the same work queues, according to an embodiment.

As discussed briefly above, the loop-carried dependency for a forward-edge 404 is intrinsically synchronized if the edge 404 lies on a path between any two nodes 402 referencing the same work queue 106. Due to the FIFO nature of the work queues 106 described above, it is not possible for a top node 402 associated with a work queue 106 to begin execution before the previous iteration has completed a bottom node 402 associated with the same work queue 106. This results in the synchronization of all loop-carried dependencies between the two nodes 402 associated with the same work queue 106. This concept is illustrated in FIG. 10, where no back-edges 802 are needed because all forward-edges 404 in the illustrated dependency graph 206 are between two nodes associated with either work queue A or work queue B.

Optimal Selection Order of Root/Leaf Pairs

Figure 11:
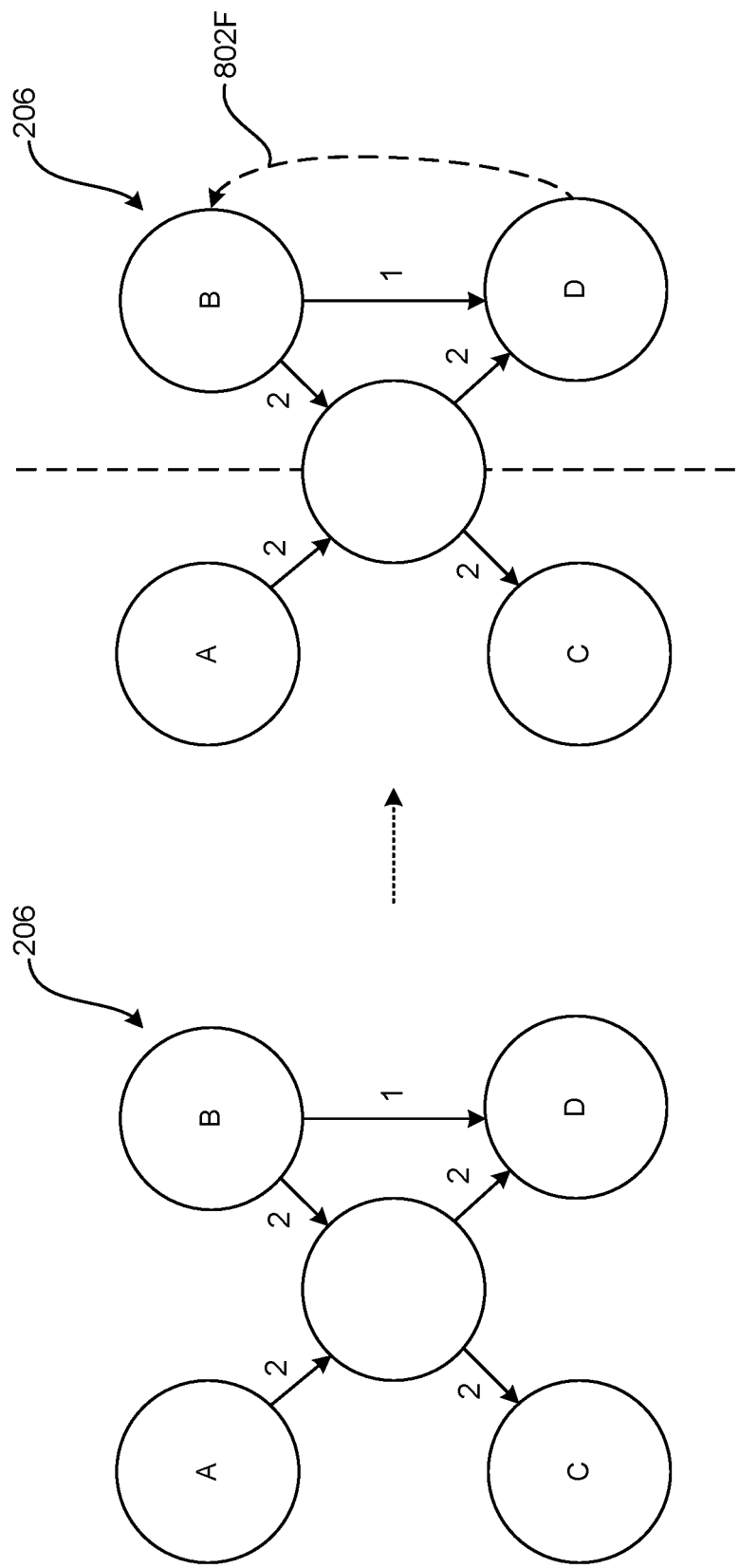
FIG. 11 is a data structure diagram that illustrates aspects of a minimum flow test utilized to determine the next root node/leaf node pair around which to add a back-edge in a dependency graph, according to an embodiment.

In an embodiment, the greedy algorithm described above adds back-edges 802 to a dependency graph 206 in an order identified by a minimum flow test and a maximum benefit test, which determine the next root node/leaf node pair around which to add a back-edge 802. The minimum flow test gives priority to the root node/leaf node pair with the smallest minimum flow. The minimum flow of a root node/leaf node pair is the flow value of the edge with the smallest flow between that root and leaf. The flow value of an edge is the number of root node/leaf node pairs that surround that edge in the dependency graph 206 for the loop. An example with a 1-minimum-flow pair is illustrated in FIG. 11. The optimal solution for this example is the addition of a back-edge 802F.

Maximum Benefit Test

The maximum benefit test is used when there is more than one root node/leaf node pair with the smallest minimum flow. This test prioritizes root node/leaf node pairs that have the most yet-unsynchronized loop-carried dependencies between them.

The example segment of a dependency graph shown in FIG. 12 shows a case where a back-edge 802G was added in a previous step, thereby synchronizing all loop-carried dependencies between A and C. The only unsynchronized edges remaining are the two rightmost ones. The maximum benefit test in this scenario ensures that the path between B and D with two unsynchronized edges is selected over the path between A and D and the path between B and C with only one unsynchronized edge. A back-edge 802H is added between B and D.

Figure 13:
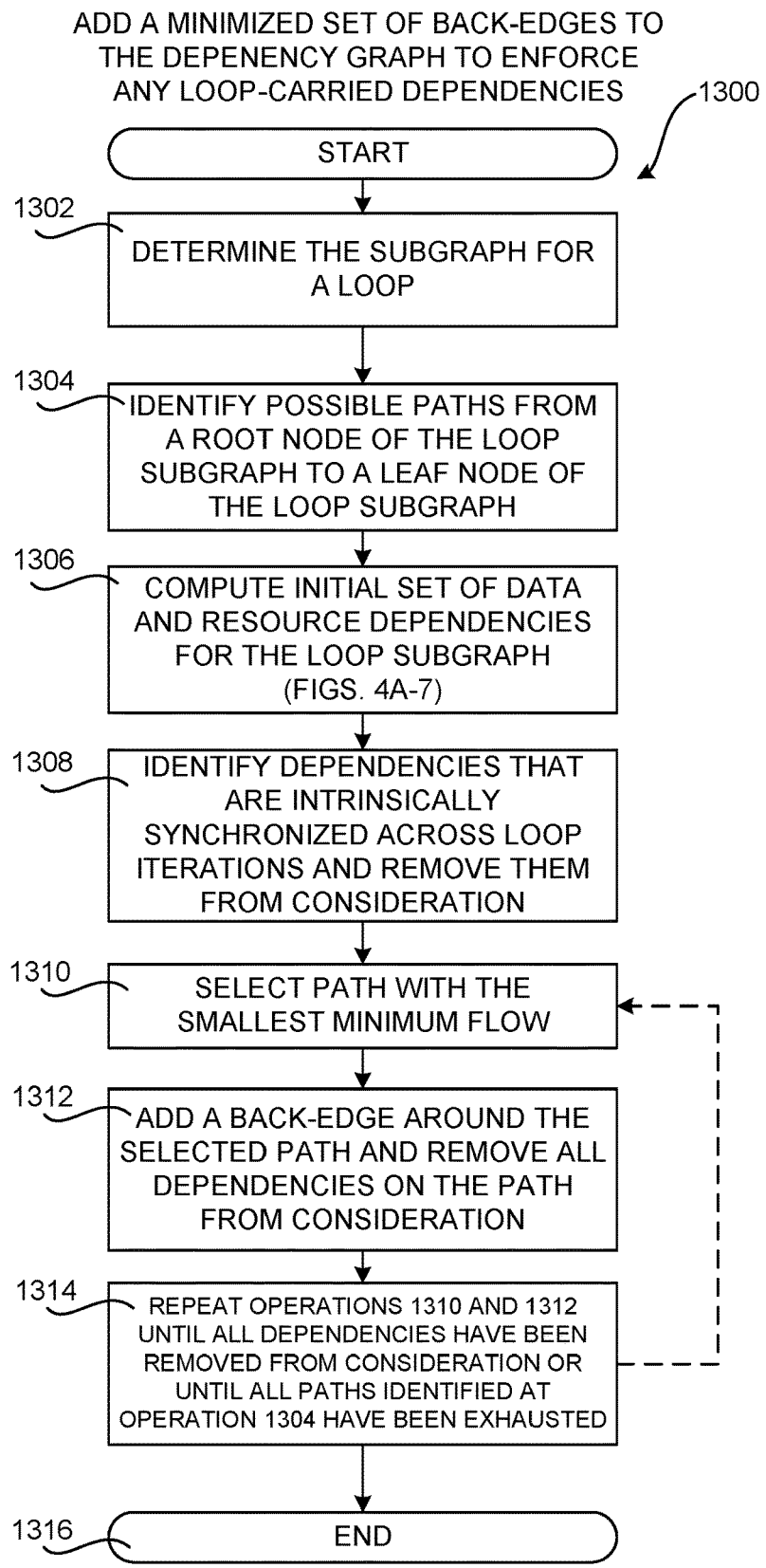
FIG. 13 is a flow diagram showing aspects of a routine for adding a minimized set of back-edges to a dependency graph to enforce loop-carried dependencies, according to an embodiment.

FIG. 13 is a flow diagram showing aspects of a routine 1300 for adding a minimized set of back-edges to a dependency graph 206 to enforce any loop-carried dependencies, according to an embodiment. The routine 1300 is performed for each loop in an IR program 204, in one embodiment.

The routine 1300 begins at operation 1302, where the compiler 200 determines a subgraph for the current loop. The subgraph is the graph comprised only of the nodes 402 for the commands 108 inside the loop. The routine 1300 then proceeds from operation 1302 to operation 1304, where the compiler 200 identifies all possible paths from a root node 402 of the loop subgraph to a leaf node 402 of the loop subgraph. The routine 1300 then proceeds from operation 1304 to operation 1306.

At operation 1306, the compiler 200 computes an initial set of data and resource dependencies for the loop subgraph. In an embodiment, the mechanism described above with regard to FIG. 5 is utilized to determine the initial set of dependencies for the nodes 402 in the loop subgraph.

From operation 1306, the routine 1300 proceeds to operation 1308, where the compiler 200 identifies dependencies that are intrinsically synchronized across loop iterations and removes them from consideration. In an embodiment, a dependency is considered to be intrinsically synchronized if it lies on any path between two nodes 402 in the subgraph of the loop that are associated with the same type of command 108.

From operation 1308, the routine 1300 proceeds to operation 1310, where the compiler 200 selects the path with the smallest minimum flow from among the paths identified at operation 1304. If multiple paths have the same smallest minimum flow (i.e., the minimum flow test described above with regard to FIG. 11), the compiler 200 selects the path containing the most dependencies that have not yet been removed from consideration (i.e., the maximum benefit test described above with regard to FIG. 12).

The routine 1300 then proceeds from operation 1310 to operation 1312, where the compiler 200 adds a back-edge 802 around the path selected at operation 1310 and removes other dependencies on the path from further consideration. The routine 1300 then proceeds from operation 1312 to operation 1314, where the compiler 200 repeats operations 1310 and 1312 until all dependencies have been removed from consideration, or until all paths identified at operation 1304 have been exhausted. From operation 1314, the routine 1300 proceeds to operation 1316, where it ends.

Optimizing the Usage of Synchronization Primitives Using a Dependency Graph

Figure 14:
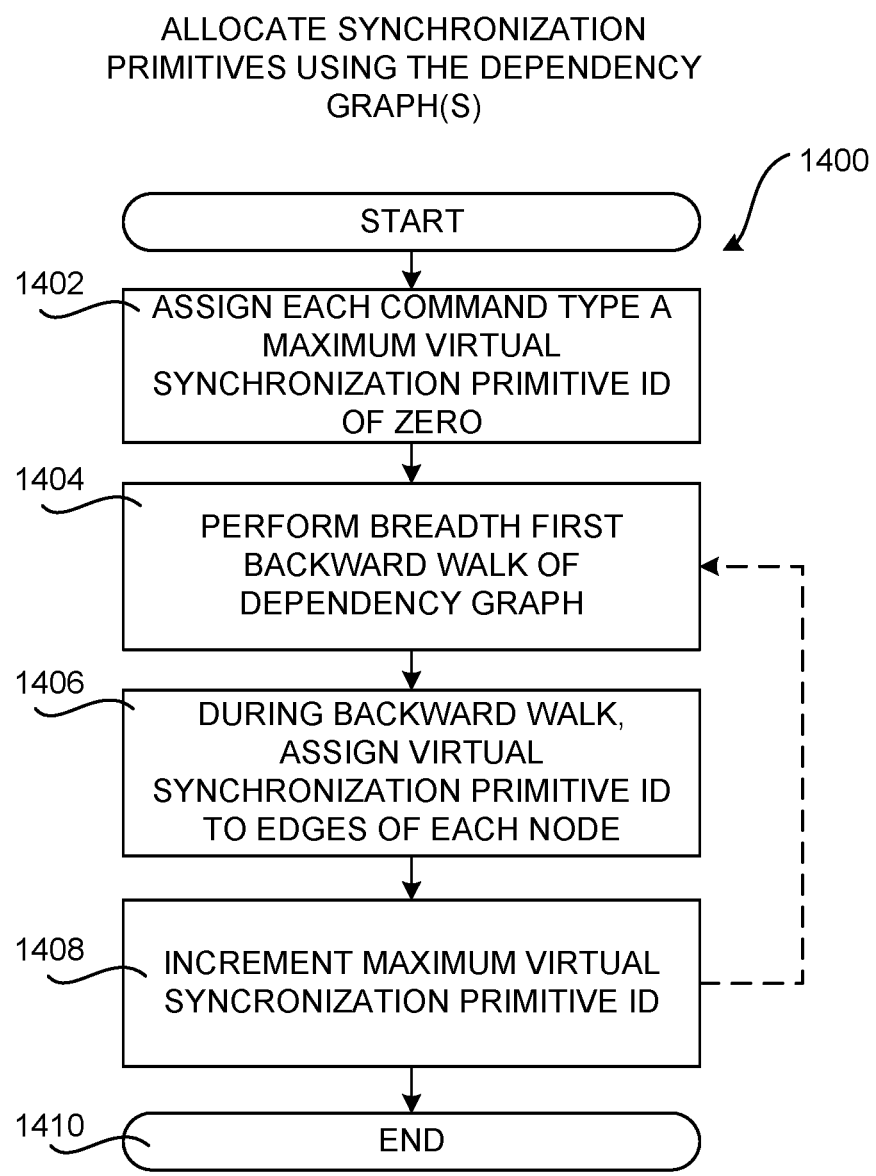
FIG. 14 is a flow diagram showing aspects of a routine for allocating synchronization primitives using a dependency graph created in the manner described with reference to FIGS. 4A-13, according to an embodiment.

FIG. 14 is a flow diagram showing aspects of a routine 1400 for allocating the synchronization primitives 112 using the dependency graph 206 created in the manner described with reference to FIGS. 4A-13, according to an embodiment. The mechanism shown in FIG. 14 and described below allows reuse of synchronization primitives 112 which, in turn, enables larger input programs 202 to be executed while remaining within the constraints of a limited pool of synchronization primitives 112, which is not possible with previous solutions.

In the embodiment described with respect to FIG. 14, a dependency graph 206 created in the manner described above is analyzed to determine an optimized distribution of synchronization primitives 112 over the edges 404 of the dependency graph 206. In this regard it should be appreciated that other mechanisms for allocating resources using a dependency graph 206 can be utilized such as, but not limited to, a modified bankers algorithm.

The routine 1400 begins at operation 1402, where the compiler 200 assigns each type of command 108 referenced by the dependency graph 206 a maximum virtual synchronization primitive identifier ("ID") of zero. The routine 1400 then proceeds from operation 1402 to operation 1404, where the compiler performs a backward breadth-first walk of the dependency graph 206, starting with the node 402 corresponding to the last command 108 of the input program 202.

During the walk of the input program 202, the compiler 200 examines the edges 404 of each node 402 and assigns a virtual synchronization primitive ID to each edge 404 at operation 1406. The virtual synchronization primitive ID used for each node 402 is taken from another edge 404 reachable along any path starting from the initial edge. If none can be found, the virtual synchronization primitive ID used is the current virtual synchronization primitive ID assigned to that command type 108, and that maximum value is incremented at operation 1408.

In an embodiment, reachability from a back-edge 802 does not include the edges 404 reachable from that back-edge 802. Additionally, when reusing virtual synchronization primitive IDs for edges 404 within a loop, only the intrinsically synchronized edges 404 as described above are considered. From operation 1408, the routine 1400 proceeds to operation 1410, where it ends.

Two-Pass Algorithm for Creating a Dependency Graph

The compiler 200 utilizes an efficient incremental algorithm for creating the dependency graph 206 with reuse of the synchronization primitives 112 as described above, in one embodiment. This algorithm performs two passes of an IR program 204: a forward pass, which is described below with regard to FIG. 15A; and a backward pass, which is described below with regard to FIG. 15B. This enables the functionality described above to be provided based upon only two walks (i.e., the forward pass and the backward pass) over the IR program 204. Previous solutions require more than two walks, thereby consuming a greater amount of computing resources (e.g., CPU time, power, etc.) than the mechanisms disclosed herein.

Figure 15A:
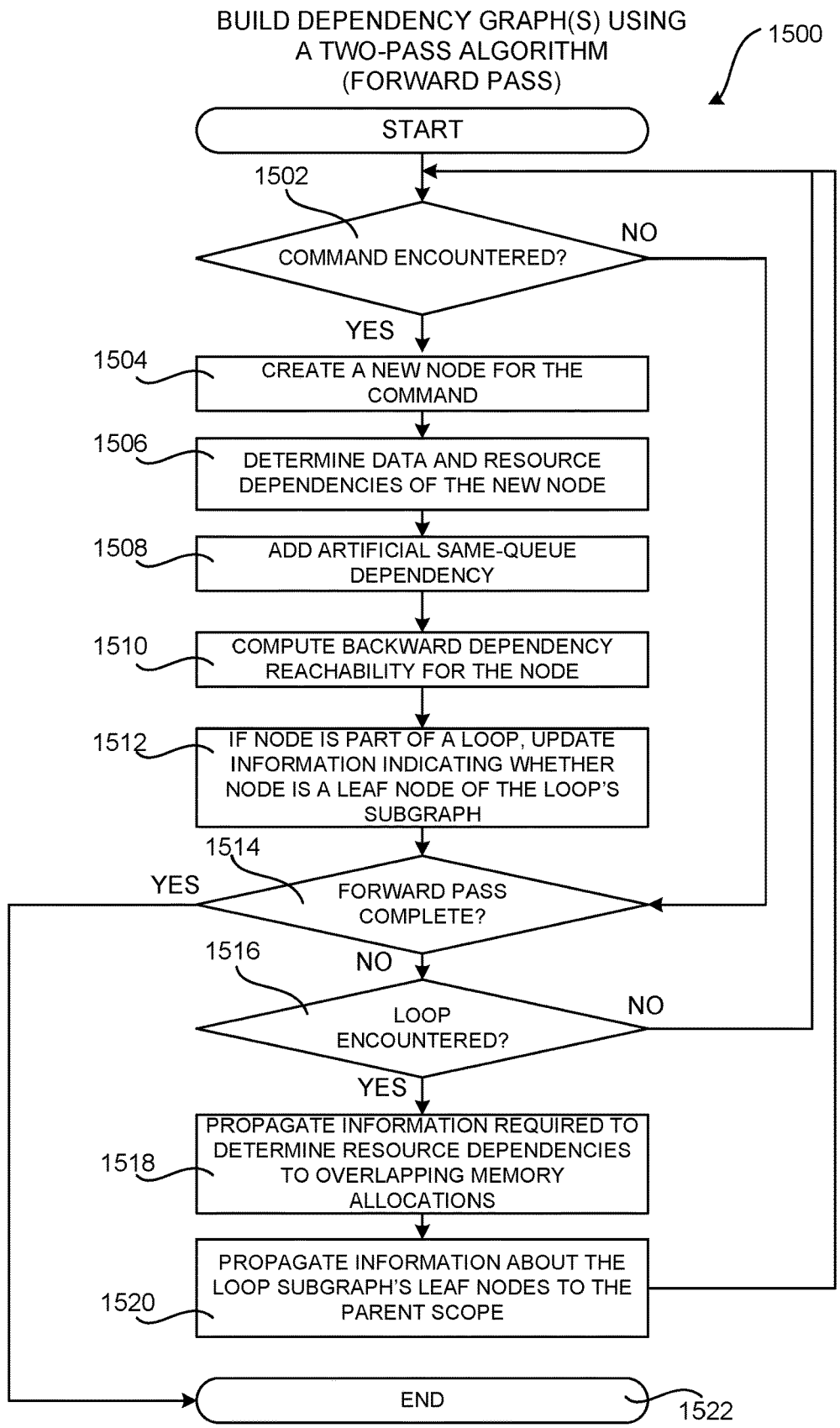
FIG. 15A is a flow diagram showing a routine illustrating aspects of a forward pass of a two-pass algorithm for creating a dependency graph, according to an embodiment.

FIG. 15A is a flow diagram showing aspects of a routine 1500 illustrating a forward pass of a two-pass algorithm for creating a dependency graph 206, according to an embodiment. The routine 1500 begins at operation 1502 where, during a forward pass of the IR program 204, the compiler 200 determines if a command 108 has been encountered. If so, the routine 1500 proceeds from operation 1502 to operation 1504.

At operation 1504, the compiler 200 creates a new node 402 for the encountered command 108 in a dependency graph 206. The routine 1500 then proceeds from operation 1504 to operation 1506, where the compiler 200 determines the data and resource dependencies of the new node 402 in relation to other nodes 402 that were created previously in the manner described above. The routine 1500 then proceeds from operation 1506 to operation 1508, where the compiler adds artificial same-queue dependencies to the dependency graph 206 in the manner also described above. The routine 1500 then proceeds from operation 1508 to operation 1510.

At operation 1510, the compiler 200 computes backward dependency reachability information for the new current node 402. The backward dependency reachability information is used in conjunction with the forward dependency reachability information to determine the edges 404 between two nodes 402. If the node 402 is part of a loop, the compiler 200 updates information about whether current node 402 is a leaf node of the loop's subgraph.

The routine 1500 then proceeds from operation 1512 to operation 1514, where a determination is made as to whether the forward pass of the IR program 204 is complete. If the forward pass is complete, the routine 1514 proceeds from operation 1514 to operation 1522, where it ends. If the forward pass is not complete, the routine 1500 proceeds from operation 1514 to operation 1516, described below.

If, at operation 1502, the compiler 200 determines that a command 108 has not been encountered, the routine 1500 proceeds from operation 1502 to operation 1516. At operation 1516, the compiler 200 determines if a loop has been encountered in the IR program 204. If a loop is not encountered, the routine 1500 proceeds from operation 1516 back to operation 1502, where the forward pass of the IR program 204 continues.

If a loop is encountered at operation 1516, the routine 1500 proceeds from operation 1516 to operation 1518 where the compiler 200 propagates information required to determine resource dependencies related to overlapping memory allocations to the parent loop if it exists. The routine 1500 then proceeds from operation to operation 1520, where the compiler 200 propagates information about the loop subgraph's leaf nodes to the parent loop. The routine 1500 then proceeds from operation 1520 back to operation 1502, where the forward pass of the IR program 204 continues.

Figure 15B:
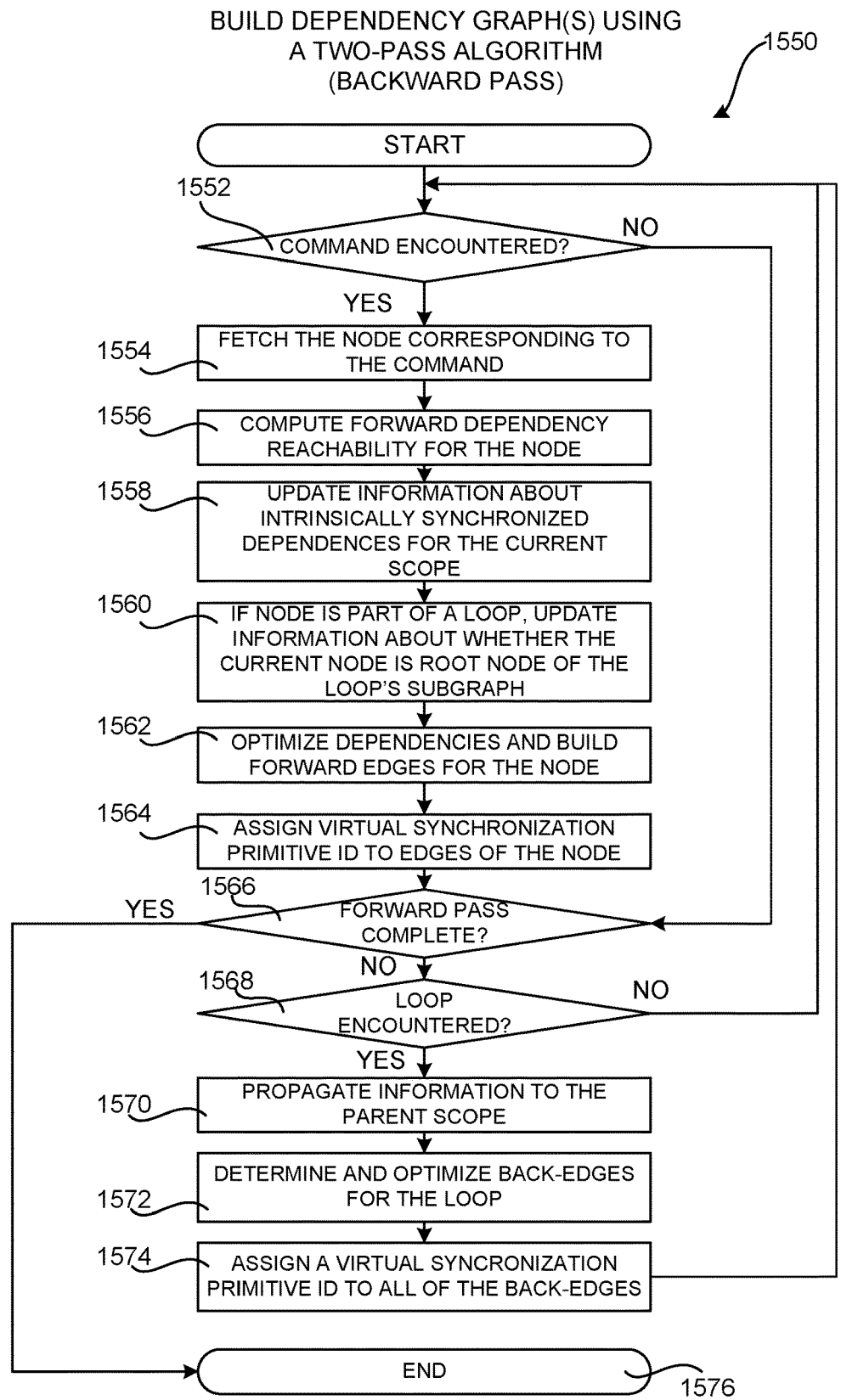
FIG. 15B is a flow diagram showing a routine illustrating aspects of a backward pass of a two-pass algorithm for creating a dependency graph, according to an embodiment.

FIG. 15B is a flow diagram showing aspects of a routine 1550 illustrating a backward pass of a two-pass algorithm for creating a dependency graph 206, according to an embodiment. The routine 1550 begins at operation 1552 where, during a backward pass of the IR program 204, the compiler 200 determines if a command 108 has been encountered. If so, the routine 1550 proceeds from operation 1552 to operation 1554.

At operation 1554, the compiler fetches the node 402 corresponding to the encountered command 108 that was created during the forward pass described above with respect to FIG. 15A. The routine 1550 then proceeds to operation 1556, where the compiler 200 computes the forward dependency reachability for the node 402 fetched at operation 1554. The routine 1550 then proceeds from operation 1556 to operation 1558, where the compiler 200 updates information about intrinsically synchronized dependencies for the current loop. The routine 1550 then proceeds from operation 1558 to operation 1560.

At operation 1560, the compiler 200 updates information about whether the current node 402 is the root node of a loop's subgraph if the current node 402 is part of a loop. The routine 1550 then proceeds to operation 1562, where the compiler 200 optimizes any dependencies in the manner described above and builds the forward edges 404 for the node 402. The compiler 200 assigns a virtual synchronization primitive ID to all edges 404 of the node 402 in the manner described above with regard to FIG. 14 at operation 1564. The routine 1550 then proceeds from operation 1564 to operation 1566.

At operation 1566, the compiler 200 determines if the backward pass of the IR program 204 is complete. If the backward pass is complete, the routine 1550 proceeds from operation 1566 to operation 1576, where it ends. If, however, the backward pass is not complete, the routine 1550 proceeds from operation 1566 to operation 1568.

At operation 1568, the compiler 200 determines if a loop has been encountered in the IR program 204. If a loop has not been encountered, the routine 1550 proceeds back to operation 1552, where the backward pass of the IR program 204 continues in the manner described above. If, however, a loop is encountered at operation 1568, the routine 1550 proceeds from operation 1568 to operation 1570.

At operation 1570, the compiler 200 propagates information about the loop subgraph's root nodes and information about intrinsically synchronized dependencies to the parent loop. The routine 1550 then proceeds to operation 1572, where the compiler 200 determines and optimizes back-edges 802 for the loop in the manner described above.

The routine 1550 proceeds from operation 1572 to operation 1574, where the compiler 200 assigns a virtual synchronization primitive ID to all back-edges 802 of the loop, also in the manner described above. From operation 1574, the routine 1550 proceeds back to operation 1552, where the backward pass of the IR program 204 continues in the manner described above.

Figure 16:
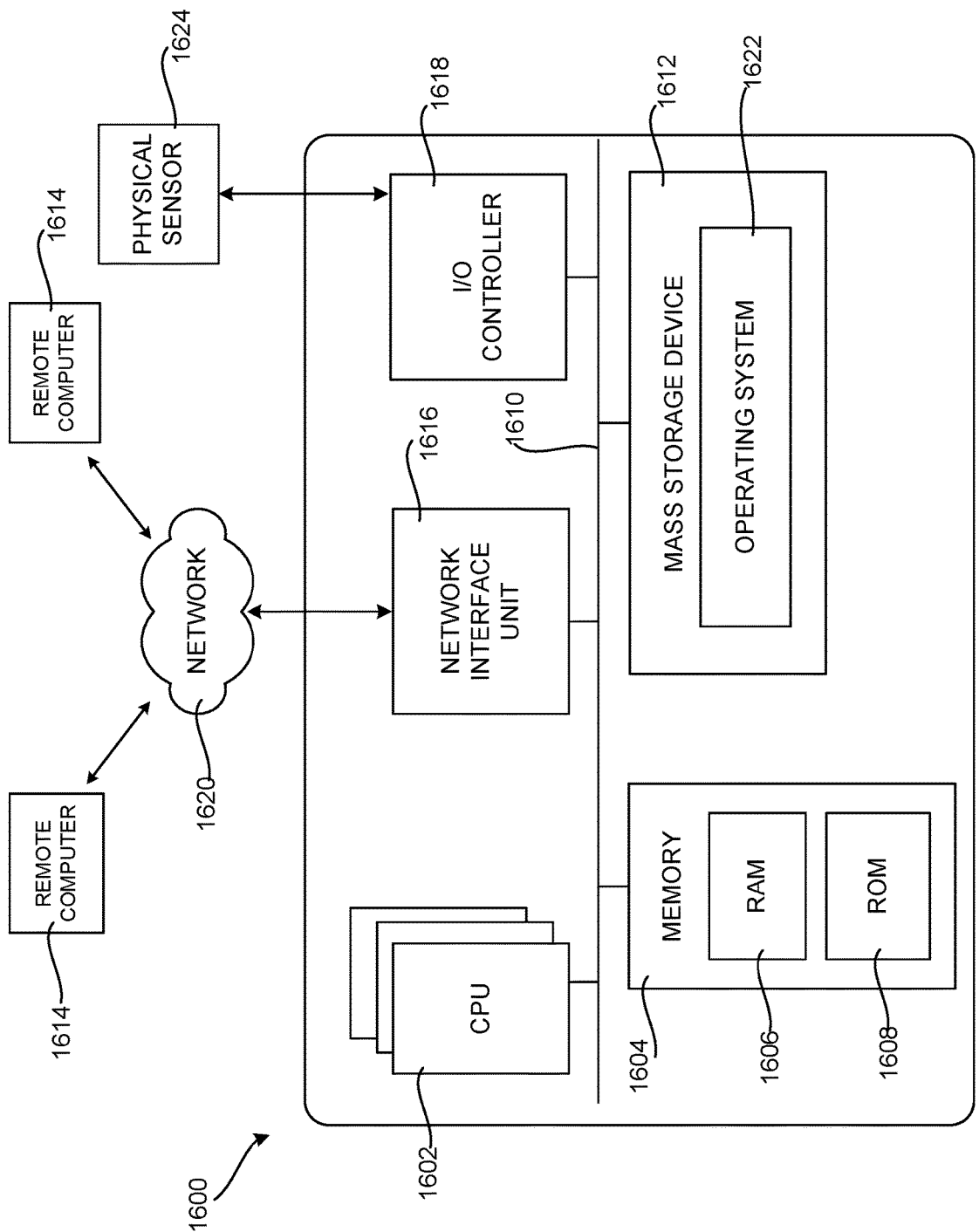
FIG. 16 is a computer architecture diagram showing an illustrative computer hardware and software architecture for a processing system that implements aspects of the technologies presented herein, in an embodiment.

FIG. 16 is a computer architecture diagram showing an illustrative computer hardware and software architecture for a processing system 1600 that implements the various technologies presented herein, in an embodiment. In particular, the architecture illustrated in FIG. 16 is utilized to implement aspects of a computing system capable of providing the functionality disclosed herein for efficient utilization of synchronization primitives 112 in a multiprocessor computing system 100, in an embodiment. For example, and without limitation, the processing system 1600 may be utilized to execute the compiler 200, which implements aspects of the functionality described above.

The processing system 1600 illustrated in FIG. 16 includes a central processing unit 1602 ("CPU"), a system memory 1604, including a random-access memory 1606 ("RAM") and a read-only memory ("ROM") 1608, and a system bus 1610 that couples the system memory 1604 to the CPU 1602, in an embodiment. A firmware (not shown in FIG. 16) containing the basic routines that help to transfer information between elements within the processing system 1600, such as during startup, is stored in the ROM 1608 in an embodiment.

The processing system 1600 further includes a mass storage device 1612 in an embodiment for storing an operating system 1622, application programs such as the compiler 200, and other types of programs, some of which have been described herein. The mass storage device 1612 is also configured to store other types of programs and data, in an embodiment.

The mass storage device 1612 is connected to the CPU 1602 through a mass storage controller (not shown in FIG. 16) connected to the bus 1610, in an embodiment. The mass storage device 1612 and its associated computer readable media provide non-volatile storage for the processing system 1600. Although the description of computer readable media contained herein refers to a mass storage device, such as a hard disk, Compact Disk Read-Only Memory ("CD-ROM") drive, Digital Versatile Disc-Read Only Memory ("DVD-ROM") drive, or Universal Serial Bus ("USB") storage key, computer readable media is any available computer-readable storage media or communication media that is accessible by the processing system 1600.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, communication media includes wired media such as a wired network or direct-wired connection, and wireless media such as acoustic, radio frequency, infrared and other wireless media. Combinations of the any of the above are also included within the scope of computer-readable media.

By way of example, computer-readable storage media includes volatile and non-volatile, removable and non-removable media implemented in any method or technology for storage of information such as computer readable instructions, data structures, program modules or other data, in an embodiment. For example, computer-readable storage media includes RAM, ROM, erasable programmable ROM ("EPROM"), electrically EPROM ("EEPROM"), flash memory or other solid-state memory technology, CD-ROM, DVD-ROM, HD-DVD, BLU-RAY®, or other optical storage, magnetic cassettes, magnetic tape, magnetic disk storage or other magnetic storage devices, or any other medium that stores the desired information and which is accessible to the processing system 1600. For purposes of the claims, the phrase "computer-readable storage medium," and variations thereof, does not include waves or signals per se or communication media.

According to various configurations, the processing system 1600 operates in a networked environment using logical connections to remote computers 1614 through a network such as the network 1620. The processing system 1600 connects to the network 1620 through a network interface unit 1616 connected to the bus 1610, in an embodiment. The network interface unit 1616 is utilized to connect to other types of networks and remote computer systems, in embodiments.

The processing system 1600 also includes an input/output controller 1618 for receiving and processing input from a number of other devices, including a keyboard, mouse, touch input, an electronic stylus (none of which are shown in FIG. 16), or a physical sensor 1624, such as a video camera, in an embodiment. Similarly, the input/output controller 1618 provides output to a display screen or other type of output device (also not shown in FIG. 16), in an embodiment.

The software components described herein, when loaded into the CPU 1602 and executed, transform the CPU 1602 and the overall processing system 1600 from a general-purpose computing device into a special-purpose processing system customized to facilitate the functionality presented herein. The CPU 1602 is constructed from transistors or other discrete circuit elements, which individually or collectively assume any number of states, in an embodiment.

More specifically, the CPU 1602 operates as a finite-state machine, in response to executable instructions contained within the software modules disclosed herein, in an embodiment. These computer-executable instructions transform the CPU 1602 by specifying how the CPU 1602 transitions between states, thereby transforming the transistors or other discrete hardware elements constituting the CPU 1602.

Encoding the software modules presented herein also transforms the physical structure of the computer readable media presented herein, in an embodiment. The specific transformation of physical structure depends on various factors, in different implementations of this description. Examples of such factors include, the technology used to implement the computer readable media, whether the computer readable media is characterized as primary or secondary storage, and the like.

For example, if the computer readable media is implemented as semiconductor-based memory, the software disclosed herein is encoded on the computer readable media by transforming the physical state of the semiconductor memory, in an embodiment. For instance, the software transforms the state of transistors, capacitors, or other discrete circuit elements constituting the semiconductor memory, in an embodiment. The software transforms the physical state of such components in order to store data thereupon, in an embodiment.

As another example, the computer readable media disclosed herein is implemented using magnetic or optical technology, in an embodiment. In such implementations, the program components presented herein transform the physical state of magnetic or optical media, when the software is encoded therein. These transformations include altering the magnetic characteristics of particular locations within given magnetic media, in an embodiment. These transformations also include altering the physical features or characteristics of particular locations within given optical media, to change the optical characteristics of those locations, in an embodiment. Other transformations of physical media are possible without departing from the scope and spirit of the present description, with the foregoing examples provided only to facilitate this discussion.

It is to be appreciated that the architecture shown in FIG. 16 for the processing system 1600, or a similar architecture, is suitable for implementing other types of computing devices, including hand-held computers, video game devices, embedded computer systems, mobile devices such as smartphones, tablets, alternate reality ("AR"), mixed reality ("MR"), and virtual reality ("VR") devices, and other types of computing devices known to those skilled in the art. It is also contemplated that the processing system 1600 might not include all of the components shown in FIG. 16, include other components that are not explicitly shown in FIG. 16, or an utilize an architecture completely different than that shown in FIG. 16, according to embodiments.

Figure 17:
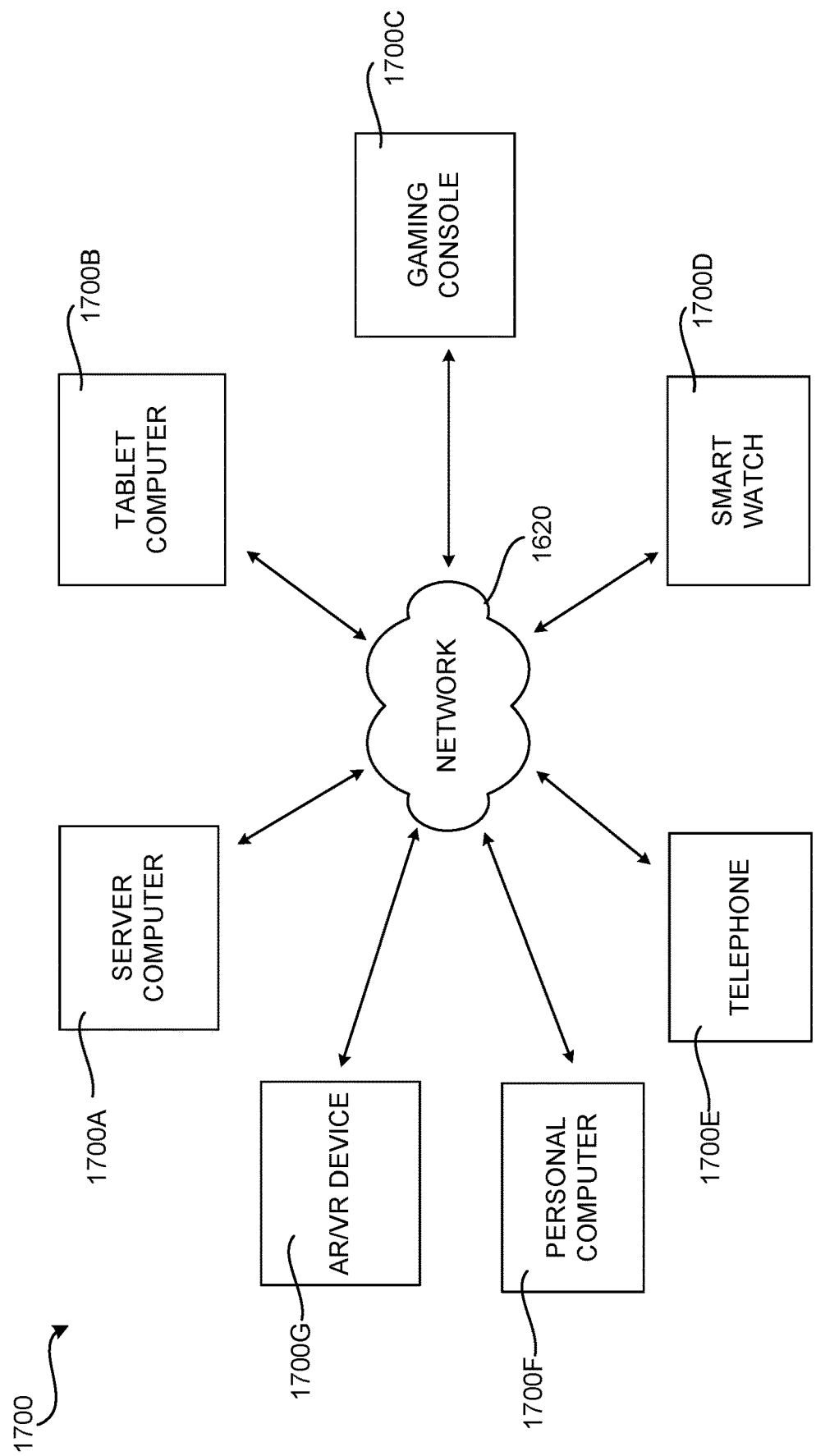
FIG. 17 is a network diagram illustrating an example distributed computing environment in which aspects of the disclosed technologies are implemented, in an embodiment.

FIG. 17 is a network diagram illustrating a distributed network computing environment 1700 in which aspects of the disclosed technologies are implemented, according to various embodiments presented herein. As shown in FIG. 17, one or more server computers 1700A are interconnected via a network 1620 (which might be either of, or a combination of, a fixed-wire or WLAN, wide-area network ("WAN"), intranet, extranet, peer-to-peer network, VPN, the internet, Bluetooth® communication network, proprietary low voltage communication network, or other communication network) with a number of client computing devices such as a tablet computer 1700B, a gaming console 1700C, a smart watch 1700D, a telephone 1700E, such as a smartphone, a personal computer 1700F, and an AR/VR device 1700G.

In a network environment in which the network 1620 is the internet, for example, the server computer 1700A is a dedicated server computer operable to process and communicate data to and from the client computing devices 1700B-1700G via any of a number of known protocols, such as, hypertext transfer protocol ("HTTP"), file transfer protocol ("FTP"), or simple object access protocol ("SOAP").

Additionally, the network computing environment 1700 utilizes various data security protocols such as secured socket layer ("SSL") or pretty good privacy ("PGP"), in an embodiment. Each of the client computing devices 1700B-1700G is equipped with an OS, such as the OS 1622, operable to support one or more computing applications or terminal sessions such as a web browser (not shown in FIG.

17), graphical UI (not shown in FIG. 17), or a mobile desktop environment (not shown in FIG. 17) to gain access to the server computer 1700A, in an embodiment.

The server computer 1700A is communicatively coupled to other computing environments (not shown in FIG. 17) and receives data regarding a participating user's interactions, in an embodiment. In an illustrative operation, a user (not shown in FIG. 17) interacts with a computing application running on a client computing device 1700B-1700G to obtain desired data and/or perform other computing applications.

The data and/or computing applications are stored on the server 1700A, or servers 1700A, and communicated to cooperating users through the client computing devices 1700B-1700G over the network 1620, in an embodiment. A participating user (not shown in FIG. 17) requests access to specific data and applications housed in whole or in part on the server computer 1700A. These data are communicated between the client computing devices 1700B-1700G and the server computer 1700A for processing and storage, in an embodiment.

The server computer 1700A hosts computing applications, processes and applets for the generation, authentication, encryption, and communication of data and applications such as those described above with regard to FIGS. 1-15, and cooperates with other server computing environments (not shown in FIG. 17), third party service providers (not shown in FIG. 17), and network attached storage ("NAS") and storage area networks ("SAN") (also not shown in FIG. 17) to realize application/data transactions, in an embodiment.

The computing architecture shown in FIG. 16 and the distributed network computing environment shown in FIG. 17 have been simplified for ease of discussion. The computing architecture and the distributed computing network include and utilize many more computing components, devices, software programs, networking devices, and other components not specifically described herein, in an embodiment. Those skilled in the art will also appreciate that the subject matter described herein can be practiced with other computer system configurations other than those shown in FIGS. 16 and 17, including hand-held devices, multiprocessor systems, microprocessor-based or programmable consumer electronics, computing or processing systems embedded in devices (such as wearable computing devices, automobiles, home automation, etc.), minicomputers, mainframe computers, and the like.

It is to be further understood that the operations of the routines and methods disclosed herein are not presented in any particular order and that performance of some or all of the operations in an alternative order, or orders, is possible and is contemplated. The operations have been presented in the demonstrated order for ease of description and illustration. Operations might be added, omitted, and/or performed simultaneously, without departing from the scope of the appended claims. The illustrated routines and methods might end at any time and need not be performed in their entireties.

Some or all operations of the methods, and/or substantially equivalent operations, are performed by execution of computer-readable instructions included on a computer-readable storage media, as defined herein, in an embodiment. The term "computer-readable instructions," and variants thereof, as used herein, is used expansively herein to include routines, applications, application modules, program modules, programs, program components, data structures, algorithms, and the like. Computer-readable instructions are implemented on various system configurations, including single-processor or multiprocessor systems, minicomputers, mainframe computers, personal computers, hand-held computing devices, microprocessor-based, programmable consumer electronics, combinations thereof, and the like.

The logical operations described herein are implemented (1) as a sequence of computer implemented acts or program modules running on a computing system and/or (2) as interconnected machine logic circuits or circuit modules within the computing system, according to an embodiment. The implementation is a matter of choice dependent on the performance and other requirements of the computing system. Accordingly, the logical operations described herein are referred to variously as states, operations, structural devices, acts, or modules. These operations, structural devices, acts, and modules are implemented in software, in firmware, in special purpose digital logic, and any combination thereof, according to embodiments.

For example, the operations illustrated in the sequence and flow diagrams and described herein are implemented in embodiments, at least in part, by modules implementing the features disclosed herein such as a dynamically linked library ("DLL"), a statically linked library, functionality provided by an API, a network service, a compiled program, an interpreted program, a script, or any other executable set of instructions. Data is stored in a data structure in one or more memory components, in an embodiment. Data is retrieved from the data structure by addressing links or references to the data structure, in an embodiment.

The methods and routines described herein might be also implemented in many other ways. For example, the routines and methods are implemented, at least in part, by a processor of another remote computer or a local circuit, in an embodiment. In addition, one or more of the operations of the routines or methods are alternatively or additionally implemented, at least in part, by a chipset working alone or in conjunction with other software modules, in an embodiment.

The disclosure presented herein also encompasses the subject matter set forth in the following clauses:

Clause 1. A computer-implemented method, comprising: minimizing edges in a dependency graph for a function in an input program, the dependency graph comprising nodes corresponding to commands in the function and edges corresponding to dependencies between the nodes; adding a minimized set of back-edges to the dependency graph to enforce loop-carried resource dependencies in the input program; and allocating synchronization primitives provided by a multiprocessor computing system to the commands in the function of the input program based on the dependency graph.

Clause 2. The computer-implemented method of clause 1, wherein the dependencies between the nodes are identified using a shared queue analysis that creates an edge in the dependency graph between a first node corresponding to a first command and a second node corresponding to a second command, the first command and the second command having a same command type.

Clause 3. The computer-implemented method of any of clauses 1 or 2, wherein the dependencies between the nodes are identified using an input/output analysis that creates an edge in the dependency graph between a first node corresponding to a first command that uses a buffer and a second node corresponding to a second command that uses the buffer.

Clause 4. The computer-implemented method of any of clauses 1-3, wherein the dependencies between the nodes are identified using an allocation overlap analysis that creates an edge in the dependency graph between a first node corresponding to a first command that uses a range of memory addresses and a second node corresponding to a second command that all or a portion of the range of memory addresses.

Clause 5. The computer-implemented method of any of clauses 1-4, wherein minimizing the edges corresponding to the dependencies between the nodes in the dependency graph comprises: performing a forward reachability analysis on the dependency graph to eliminate one or more dependencies; and adding edges to the dependency graph for dependencies other than artificial dependencies that remain following the forward reachability analysis.

Clause 6. The computer-implemented method of any of clauses 1-5, wherein the minimized set of back-edges comprises a first back-edge from a leaf node in a dependency graph for a loop to a first root node in the dependency graph for the loop and a second back-edge from the leaf node to a second root node in the dependency graph for the loop.

Clause 7. The computer-implemented method of any of clauses 1-6, wherein the synchronization primitives provided by a multiprocessor computing system comprise semaphores.

Clause 8. A computer-readable storage medium having computer-executable instructions stored thereupon which, when executed by a processing system, cause the processing system to: create a dependency graph for a function in an input program, the dependency graph comprising nodes corresponding to commands in the function and edges corresponding to dependencies between the nodes; eliminate at least one of the edges from the dependency graph; add at least one back-edge to the dependency graph to enforce a loop-carried resource dependency in the input program; and allocate synchronization primitives provided by a multiprocessor computing system to the commands in the function of the input program based on the dependency graph.

Clause 9. The computer-readable storage medium of clause 8, wherein the dependencies between the nodes are identified using a shared queue analysis that creates an edge in the dependency graph between a first node corresponding to a first command and a second node corresponding to a second command, the first command and the second command having a same command type.

Clause 10. The computer-readable storage medium of any of clauses 8 or 9, wherein the dependencies between the nodes are identified using an input/output analysis that creates an edge in the dependency graph between a first node corresponding to a first command that uses a buffer and a second node corresponding to a second command that uses the buffer.

Clause 11. The computer-readable storage medium of any of clauses 8-10, wherein the dependencies between the nodes are identified using an allocation overlap analysis that creates an edge in the dependency graph between a first node corresponding to a first command that uses a range of memory addresses and a second node corresponding to a second command that all or a portion of the range of memory addresses.

Clause 12. The computer-readable storage medium of any of clauses 8-11, wherein eliminating at least one of the edges from the dependency graph comprises: performing a forward reachability analysis on the dependency graph to eliminate one or more dependencies; and adding edges to the dependency graph for dependencies other than artificial dependencies that remain following the forward reachability analysis.

Clause 13. The computer-readable storage medium of any of clauses 8-12, wherein the at least one back-edge comprises a back-edge from a leaf node to a root node in the dependency graph.

Clause 14. The computer-readable storage medium of any of clauses 8-13, wherein the synchronization primitives provided by a multiprocessor computing system comprise semaphores.

Clause 15. A processing system, comprising: a processor; and a computer-readable storage medium having computer-executable instructions stored thereupon that, when executed by the processing system, cause the processing system to: create a dependency graph for a function in an input program, the dependency graph comprising nodes corresponding to commands in the function and edges corresponding to dependencies between the nodes; eliminate at least one of the edges from the dependency graph; add at least one back-edge to the dependency graph to enforce a loop-carried resource dependency in the input program; and allocate synchronization primitives provided by a multiprocessor computing system to the commands in the function of the input program based on the dependency graph.

Clause 16. The processing system of clause 15, wherein the dependencies between the nodes are identified using a shared queue analysis that creates an edge in the dependency graph between a first node corresponding to a first command and a second node corresponding to a second command, the first command and the second command having a same command type.

Clause 17. The processing system of any of clauses 15 or 16, wherein the dependencies between the nodes are identified using an input/output analysis that creates an edge in the dependency graph between a first node corresponding to a first command that uses a buffer and a second node corresponding to a second command that uses the buffer.

Clause 18. The processing system of any of clauses 15-17, wherein the dependencies between the nodes are identified using an allocation overlap analysis that creates an edge in the dependency graph between a first node corresponding to a first command that uses a range of memory addresses and a second node corresponding to a second command that all or a portion of the range of memory addresses.

Clause 19. The processing system of any of clauses 15-18, wherein eliminating at least one of the edges from the dependency graph comprises: performing a forward reachability analysis on the dependency graph to eliminate one or more dependencies; and adding edges to the dependency graph for dependencies other than artificial dependencies that remain following the forward reachability analysis.

Clause 20. The processing system of any of clauses 15-19, wherein the at least one back-edge comprises a back-edge from a leaf node to a root node in the dependency graph.

Technologies for enabling efficient utilization of synchronization primitives 112 in a multiprocessor computing system 100 have been disclosed herein. Although the subject matter presented herein has been described in language specific to computer structural features, methodological and transformative acts, specific computing machinery, and computer readable media, it is to be understood that the subject matter set forth in the appended claims is not limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes might be made to the subject matter described herein without following the example configurations and applications illustrated and described, and without departing from the scope of the present disclosure, which is set forth in the following claims.

What is claimed is:

1. A computer-implemented method, comprising:
    minimizing edges in a dependency graph for a function in an input program, the dependency graph comprising nodes corresponding to commands in the function and edges corresponding to dependencies between the nodes;
    adding a minimized set of back-edges to the dependency graph to enforce loop-carried resource dependencies in the input program; and
    allocating synchronization primitives provided by a multiprocessor computing system to the commands in the function of the input program based on the dependency graph.

2. The computer-implemented method of claim 1, wherein the dependencies between the nodes are identified using a shared queue analysis that creates an edge in the dependency graph between a first node corresponding to a first command and a second node corresponding to a second command, the first command and the second command having a same command type.

3. The computer-implemented method of claim 1, wherein the dependencies between the nodes are identified using an input/output analysis that creates an edge in the dependency graph between a first node corresponding to a first command that uses a buffer and a second node corresponding to a second command that uses the buffer.

4. The computer-implemented method of claim 1, wherein the dependencies between the nodes are identified using an allocation overlap analysis that creates an edge in the dependency graph between a first node corresponding to a first command that uses a range of memory addresses and a second node corresponding to a second command that all or a portion of the range of memory addresses.

5. The computer-implemented method of claim 1, wherein minimizing the edges corresponding to the dependencies between the nodes in the dependency graph comprises:
    performing a forward reachability analysis on the dependency graph to eliminate one or more dependencies; and
    adding edges to the dependency graph for dependencies other than artificial dependencies that remain following the forward reachability analysis.

6. The computer-implemented method of claim 1, wherein the minimized set of back-edges comprises a first back-edge from a leaf node in a dependency graph for a loop to a first root node in the dependency graph for the loop and a second back-edge from the leaf node to a second root node in the dependency graph for the loop.

7. The computer-implemented method of claim 1, wherein the synchronization primitives provided by a multiprocessor computing system comprise semaphores.

8. A computer-readable storage medium having computer-executable instructions stored thereupon which, when executed by a processing system, cause the processing system to:
    create a dependency graph for a function in an input program, the dependency graph comprising nodes corresponding to commands in the function and edges corresponding to dependencies between the nodes;
    eliminate at least one of the edges from the dependency graph;
    add at least one back-edge to the dependency graph to enforce a loop-carried resource dependency in the input program; and
    allocate synchronization primitives provided by a multiprocessor computing system to the commands in the function of the input program based on the dependency graph.

9. The computer-readable storage medium of claim 8, wherein the dependencies between the nodes are identified using a shared queue analysis that creates an edge in the dependency graph between a first node corresponding to a first command and a second node corresponding to a second command, the first command and the second command having a same command type.

10. The computer-readable storage medium of claim 8, wherein the dependencies between the nodes are identified using an input/output analysis that creates an edge in the dependency graph between a first node corresponding to a first command that uses a buffer and a second node corresponding to a second command that uses the buffer.

11. The computer-readable storage medium of claim 8, wherein the dependencies between the nodes are identified using an allocation overlap analysis that creates an edge in the dependency graph between a first node corresponding to a first command that uses a range of memory addresses and a second node corresponding to a second command that all or a portion of the range of memory addresses.

12. The computer-readable storage medium of claim 8, wherein eliminating at least one of the edges from the dependency graph comprises:
    performing a forward reachability analysis on the dependency graph to eliminate one or more dependencies; and
    adding edges to the dependency graph for dependencies other than artificial dependencies that remain following the forward reachability analysis.

13. The computer-readable storage medium of claim 8, wherein the at least one back-edge comprises a back-edge from a leaf node to a root node in the dependency graph.

14. The computer-readable storage medium of claim 8, wherein the synchronization primitives provided by a multiprocessor computing system comprise semaphores.

15. A processing system, comprising:
    a processor; and
    a computer-readable storage medium having computer-executable instructions stored thereupon that, when executed by the processing system, cause the processing system to:
        create a dependency graph for a function in an input program, the dependency graph comprising nodes corresponding to commands in the function and edges corresponding to dependencies between the nodes;
        eliminate at least one of the edges from the dependency graph;

add at least one back-edge to the dependency graph to enforce a loop-carried resource dependency in the input program; and allocate synchronization primitives provided by a multiprocessor computing system to the commands in the function of the input program based on the dependency graph.

16. The processing system of claim 15, wherein the dependencies between the nodes are identified using a shared queue analysis that creates an edge in the dependency graph between a first node corresponding to a first command and a second node corresponding to a second command, the first command and the second command having a same command type.

17. The processing system of claim 15, wherein the dependencies between the nodes are identified using an input/output analysis that creates an edge in the dependency graph between a first node corresponding to a first command that uses a buffer and a second node corresponding to a second command that uses the buffer.

18. The processing system of claim 15, wherein the dependencies between the nodes are identified using an allocation overlap analysis that creates an edge in the dependency graph between a first node corresponding to a first command that uses a range of memory addresses and a second node corresponding to a second command that all or a portion of the range of memory addresses.

19. The processing system of claim 15, wherein eliminating at least one of the edges from the dependency graph comprises:

performing a forward reachability analysis on the dependency graph to eliminate one or more dependencies; and adding edges to the dependency graph for dependencies other than artificial dependencies that remain following the forward reachability analysis.

20. The processing system of claim 15, wherein the at least one back-edge comprises a back-edge from a leaf node to a root node in the dependency graph.

* * * * *